(12) United States Patent
Sasaki

(10) Patent No.: US 9,367,902 B2
(45) Date of Patent: Jun. 14, 2016

(54) IMAGE PROCESSING DEVICE, ENDOSCOPE APPARATUS, ISOLATED POINT NOISE CORRECTION METHOD, AND INFORMATION STORAGE DEVICE

(71) Applicant: OLYMPUS CORPORATION, Shibuya-ku, Tokyo (JP)

(72) Inventor: Hiroshi Sasaki, Hachioji (JP)

(73) Assignee: OLYMPUS COPORATION, Tokyo (JP)

( * ) Notice: Subject to any disclaimer, the term of this patent is extended or adjusted under 35 U.S.C. 154(b) by 0 days.

(21) Appl. No.: 14/541,682

(22) Filed: Nov. 14, 2014

(65) Prior Publication Data

US 2015/0071564 A1  Mar. 12, 2015

Related U.S. Application Data

(63) Continuation of application No. PCT/JP2013/061643, filed on Apr. 19, 2013.

(30) Foreign Application Priority Data

Jun. 19, 2012  (JP) ................. 2012-137481

(51) Int. Cl.
*G06K 9/40*  (2006.01)
*G06T 5/00*  (2006.01)
*H04N 5/367*  (2011.01)

(52) U.S. Cl.
CPC .............. *G06T 5/002* (2013.01); *H04N 5/3675* (2013.01); *G06T 2207/10024* (2013.01); *G06T 2207/10068* (2013.01)

(58) Field of Classification Search
CPC ......... G06K 9/40; H04N 1/4097; H04N 5/21; H04N 5/2173; H04N 5/232; H04N 5/23229; H04N 5/367; G06T 5/002; G06T 5/20; G06T 7/0083; G06T 2207/10008; G06T 2007/10024; G06T 2207/10068; G06T 2207/20028; G06T 2207/20032; G06T 2207/20221; G06T 2207/30101; G02B 21/00; A61B 1/00009; A61B 1/05; A61B 5/489

See application file for complete search history.

(56) References Cited

U.S. PATENT DOCUMENTS 7,656,442 B2 *  2/2010  Tsuruoka ............... H04N 5/367
                                                  348/222.1
7,860,330 B2 * 12/2010  Ishiguro ............... H04N 1/4097
                                                  358/463

(Continued)

FOREIGN PATENT DOCUMENTS

JP         2004304641 A    10/2004
JP         2005039542 A     2/2005

(Continued)

OTHER PUBLICATIONS

International Search Report (ISR) dated Jul. 30, 2013 issued in International Application No. PCT/JP2013/061643.

*Primary Examiner* — Jose Couso
(74) *Attorney, Agent, or Firm* — Holtz, Holtz & Volek PC

(57) ABSTRACT

An image processing device includes an isolated point noise detection section, and an isolated point noise correction section. The isolated point noise detection section determines whether or not isolated point noise is included within a given area based on a first index value that represents the range of first to nth pixel values being obtained by arranging the pixel values of pixels within the given area including an attention pixel in ascending or descending order, and a second index value that represents the range of a pixel value group being obtained by excluding at least one of the first pixel value and the nth pixel value from the first to nth pixel values. The isolated point noise detection section determines whether or not the attention pixel is a pixel that corresponds to isolated point noise when it has been determined that isolated point noise is included within the given area.

18 Claims, 13 Drawing Sheets

(56) References Cited

U.S. PATENT DOCUMENTS

| | | | |
|---|---|---|---|
| 8,526,758 B2* | 9/2013 | Uemura | G06K 9/40 358/3.26 |
| 8,639,002 B2* | 1/2014 | Tanaka | A61B 1/05 382/128 |
| 8,711,250 B2* | 4/2014 | Higuchi | G06T 5/002 348/241 |
| 2007/0086674 A1 | 4/2007 | Guan | |
| 2010/0215266 A1 | 8/2010 | Higuchi | |
| 2012/0010465 A1 | 1/2012 | Erikawa et al. | |

FOREIGN PATENT DOCUMENTS

| | | |
|---|---|---|
| JP | 2007143120 A | 6/2007 |
| JP | 2010193070 A | 9/2010 |
| JP | 2010276796 A | 12/2010 |
| JP | 2012016545 A | 1/2012 |

\* cited by examiner

IMAGE PROCESSING DEVICE, ENDOSCOPE APPARATUS, ISOLATED POINT NOISE CORRECTION METHOD, AND INFORMATION STORAGE DEVICE

CROSS REFERENCE TO RELATED APPLICATION

This application is a continuation of International Patent Application No. PCT/JP2013/061643, having an international filing date of Apr. 19, 2013, which designated the United States, the entirety of which is incorporated herein by reference. Japanese Patent Application No. 2012-137481 filed on Jun. 19, 2012 is also incorporated herein by reference in its entirety.

BACKGROUND

The present invention relates to an image processing device, an endoscope apparatus, an isolated point noise correction method, an information storage device, and the like.

Isolated point noise having a high noise level may occur due to a pixel defect of an image sensor, or a transmission error that occurs when transmitting the captured image via wireless transmission, for example. Such isolated point noise has been normally corrected by performing a median filtering process on the image.

JP-A-2007-143120 discloses a method that determines that an attention pixel is isolated point noise when the difference between the pixel value of the attention pixel and the pixel value of its peripheral pixel is equal to or larger than a first threshold value, and the difference between the pixel values of the peripheral pixels is equal to or smaller than a second threshold value, and corrects the pixel value of the attention pixel that has been determined to be isolated point noise based on the pixel value of the peripheral pixel.

SUMMARY

According to one aspect of the invention, there is provided an image processing device comprising:

an isolated point noise detection section that detects isolated point noise that is included in an image; and an isolated point noise correction section that corrects the isolated point noise detected by the isolated point noise detection section, the isolated point noise detection section including an isolated point noise presence/absence determination section and an attention pixel isolated point noise determination section, the isolated point noise presence/absence determination section determining whether or not the isolated point noise is included within a given area based on a first index value that represents a range of first to nth pixel values, and a second index value that represents a range of a pixel value group, the given area including an attention pixel that is an isolated point noise detection target, the first to nth pixel values being obtained by arranging pixel values of pixels within the given area in ascending or descending order, and the pixel value group being obtained by excluding at least one of the first pixel value and the nth pixel value from the first to nth pixel values, and the attention pixel isolated point noise determination section determining whether or not the attention pixel is a pixel that corresponds to the isolated point noise when it has been determined that the isolated point noise is included within the given area.

According to another aspect of the invention, there is provided an image processing device comprising:

an isolated point noise detection section that detects isolated point noise that is included in an image; and an isolated point noise correction section that corrects the isolated point noise detected by the isolated point noise detection section, the isolated point noise detection section determining whether or not the isolated point noise is included within a given area including an attention pixel that is an isolated point noise detection target, based on pixel values of pixels within the given area, and determining whether or not the attention pixel is a pixel that corresponds to the isolated point noise when it has been determined that the isolated point noise is included within the given area.

According to another aspect of the invention, there is provided an isolated point noise correction method comprising:

calculating a first index value that represents a range of first to nth pixel values, and a second index value that represents a range of a pixel value group, the first to nth pixel values being obtained by arranging pixel values of pixels within a given area in ascending or descending order, the pixel value group being obtained by excluding at least one of the first pixel value and the nth pixel value from the first to nth pixel values, and the given area including an attention pixel that is an isolated point noise detection target;

determining whether or not the isolated point noise is included within the given area based on the first index value and the second index value;

determining whether or not the attention pixel is a pixel that corresponds to the isolated point noise when it has been determined that the isolated point noise is included within the given area; and correcting a pixel value of the attention pixel when it has been determined that the attention pixel is a pixel that corresponds to the isolated point noise.

According to another aspect of the invention, there is provided a computer-readable storage device with an executable image processing program stored thereon, wherein the image processing program instructs a computer to perform steps of:

calculating a first index value that represents a range of first to nth pixel values, and a second index value that represents a range of a pixel value group, the first to nth pixel values being obtained by arranging pixel values of pixels within a given area in ascending or descending order, the pixel value group being obtained by excluding at least one of the first pixel value and the nth pixel value from the first to nth pixel values, and the given area including an attention pixel that is an isolated point noise detection target;

determining whether or not the isolated point noise is included within the given area based on the first index value and the second index value;

determining whether or not the attention pixel is a pixel that corresponds to the isolated point noise when it has been determined that the isolated point noise is included within the given area; and correcting a pixel value of the attention pixel when it has been determined that the attention pixel is a pixel that corresponds to the isolated point noise.

DESCRIPTION OF EXEMPLARY EMBODIMENTS

Figure 1:
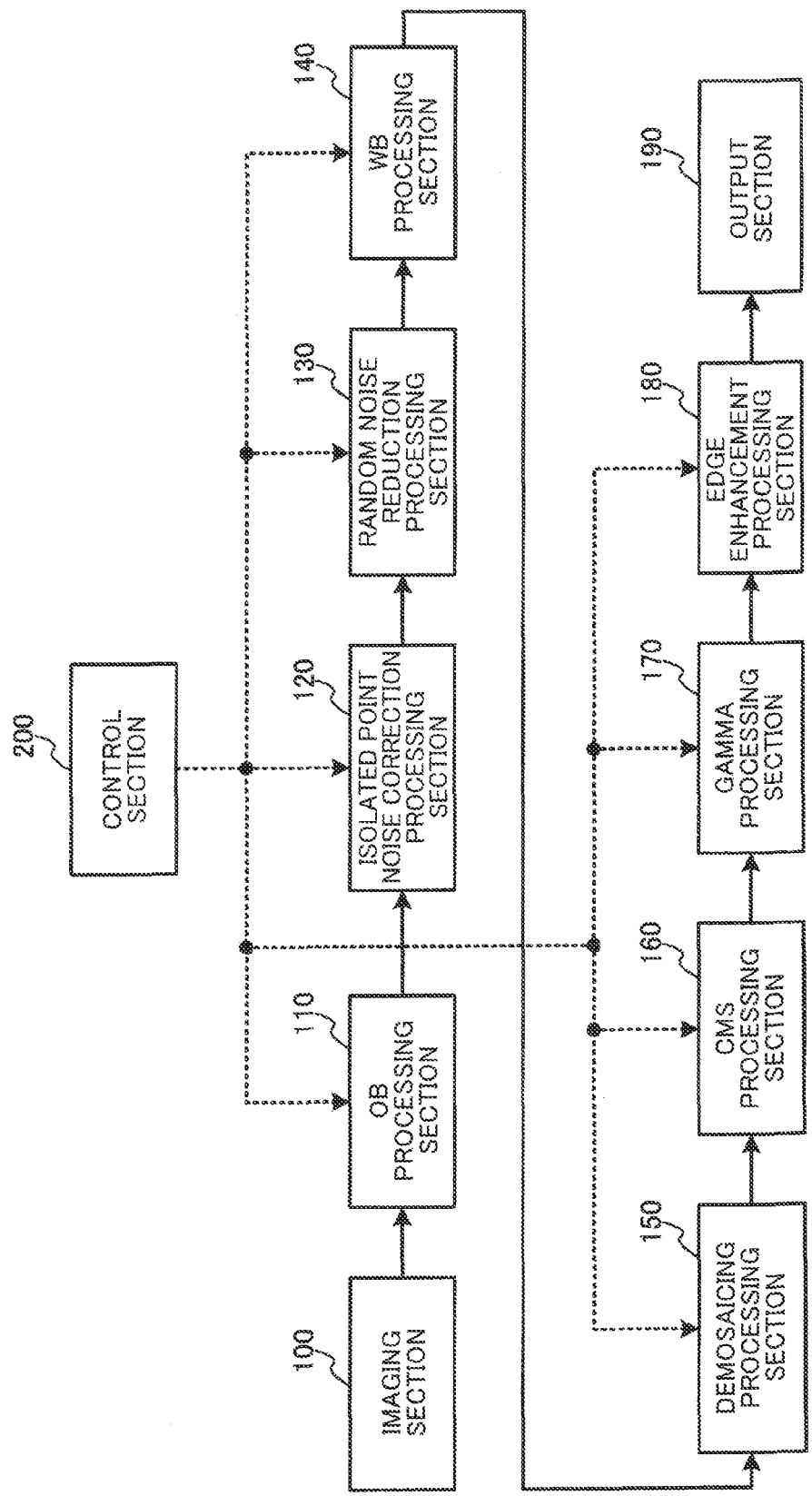
FIG. 1 illustrates a configuration example of an image processing device.

According to one embodiment of the invention, there is provided an image processing device comprising:

an isolated point noise detection section that detects isolated point noise that is included in an image; and an isolated point noise correction section that corrects the isolated point noise detected by the isolated point noise detection section, the isolated point noise detection section including an isolated point noise presence/absence determination section and an attention pixel isolated point noise determination section, the isolated point noise presence/absence determination section determining whether or not the isolated point noise is included within a given area based on a first index value that represents a range of first to nth pixel values, and a second index value that represents a range of a pixel value group, the given area including an attention pixel that is an isolated point noise detection target, the first to nth pixel values being obtained by arranging pixel values of pixels within the given area in ascending or descending order, and the pixel value group being obtained by excluding at least one of the first pixel value and the nth pixel value from the first to nth pixel values, and the attention pixel isolated point noise determination section determining whether or not the attention pixel is a pixel that corresponds to the isolated point noise when it has been determined that the isolated point noise is included within the given area.

According to one embodiment of the invention, whether or not isolated point noise is included within the given area including the attention pixel is determined based on the first index value and the second index value, and whether or not the attention pixel is a pixel that corresponds to isolated point noise is determined when it has been determined that isolated point noise is included within the given area. This makes it possible to adaptively detect isolated point noise corresponding to a local change in pixel value of the image.

Exemplary embodiments of the invention are described below. Note that the following exemplary embodiments do not in any way limit the scope of the invention laid out in the claims. Note also that all of the elements described below in connection with the following exemplary embodiments should not necessarily be taken as essential elements of the invention.

1. Outline

Random noise, fixed pattern noise, and isolated point noise have been known as noise that may be included in image data. The term "random noise" refers to noise that occurs due to a photoelectric conversion process performed by an image sensor. The term "fixed pattern noise" refers to noise that occurs due to a variation in circuit characteristics (e.g., amplifier gain) provided to each readout line when reading a pixel value from an image sensor using a multi-line readout process. The term "isolated point noise" refers to noise having a high noise level that occurs due to a pixel defect of an image sensor, or a transmission error that occurs when transmitting the captured image via wireless transmission, for example.

Random noise and fixed pattern noise have been normally reduced by performing a process that utilizes a smoothing filter on an attention pixel and peripheral pixels adjacent thereto. In recent years, an edge-preserving smoothing filter (e.g., ε-filter or bilateral filter) that can reduce noise while preserving an edge has been used as the smoothing filter.

However, since isolated point noise is regarded as an edge when removing isolated point noise, it is impossible to reduce isolated point noise using the edge-preserving smoothing filter. Isolated point noise is normally corrected by performing a median filtering process on a given extracted area (attention pixel and its peripheral pixels). The median filter has frequency characteristics that allow an edge component to remain as compared with a non-edge-preserving smoothing filter (e.g., Gaussian filter), and can remove the largest pixel value or the smallest pixel value within the extracted area (processing target) that corresponds to isolated point noise.

However, a decrease in resolution occurs when the median filter is uniformly applied to the entire image. Therefore, a method is normally employed that detects isolated point noise by performing an isolated point noise correction process, and performs a smoothing filtering process (e.g., median filtering process) on only the detected isolated point noise and its peripheral pixels. In particular, since the position of isolated point noise rarely changes when the isolated point noise has occurred due to a defect pixel of the image sensor, it is possible to detect the defect pixel (white defect pixel or black defect pixel) by capturing a given chart in advance. The position of the defect pixel can be recorded on a memory provided in an imaging device, and the correction process can be performed only on the position of the defect pixel recorded in the memory.

However, when isolated point noise has occurred due to a random event (e.g., an error during image transmission), it is necessary to detect the isolated point noise that has occurred randomly from the transmitted image, and correct the detected isolated point noise. For example, JP-A-2007-143120 discloses the following method that successively detects isolated point noise. Specifically, the attention pixel is determined to be isolated point noise when the difference between the pixel value of the attention pixel and the pixel value of its peripheral pixel is equal to or larger than a first threshold value, and the difference between the pixel values of the peripheral pixels is equal to or smaller than a second threshold value.

According to this method, it is possible to detect isolated point noise with high accuracy when the area around the attention pixel is flat. However, the detection accuracy decreases when an edge is present in the area around the attention pixel. This is because the first threshold value and the second threshold value are fixed, and are not synchronized with a local change in pixel value of the processing target image.

According to several embodiments of the invention, whether or not isolated point noise is present at a pixel among pixels $P(-1, -1)$ to $P(1, 1)$ within a given area including an attention pixel is determined (described later with reference to FIG. 4 and the like). When it has been determined that isolated point noise is present at a pixel among the pixels $P(-1, -1)$ to $P(1, 1)$ within the given area, whether or not the attention pixel $P(0, 0)$ is the isolated point noise is determined. When it has been determined that the attention pixel $P(0, 0)$ is the isolated point noise, the isolated point noise is corrected.

According to this configuration, it is possible to determine whether or not a prominent pixel value that corresponds to isolated point noise is present within the given area. Therefore, even when a local change in pixel value (e.g., edge) is present around the attention pixel, it is possible to determine whether or not isolated point noise is present within the given area without being affected by such a local change in pixel value. When it has been determined that a prominent pixel value is present within the given area, whether or not the pixel is the attention pixel is determined to detect isolated point noise.

2. First Embodiment 2.1. Image Processing Device

A first embodiment of the invention is described in detail below. FIG. 1 illustrates a configuration example of an image processing device according to the first embodiment.

The image processing device illustrated in FIG. 1 includes an imaging section 100, an OB (optical black) processing section 110, an isolated point noise correction processing section 120, a random noise reduction processing section 130, a WB (white balance) processing section 140, a demosaicing processing section 150, a CMS (color management system) processing section 160, a gamma processing section 170, an edge enhancement processing section 180, an output section 190, and a control section 200. Note that the configuration of the image processing device is not limited to the configuration illustrated in FIG. 1. Various modifications may be made, such as omitting some (e.g., imaging section 100, control section 200, and output section 190) of the elements, or adding other elements.

The control section 200 is bidirectionally connected to the OB processing section 110, the isolated point noise correction processing section 120, the random noise reduction processing section 130, the WB processing section 140, the demosaicing processing section 150, the CMS processing section 160, the gamma processing section 170, and the edge enhancement processing section 180, and exchanges parameters used during the process performed by each section with each section.

The imaging section 100 includes an imaging lens, an image sensor, and an A/D conversion section, for example. The image sensor is implemented by a CCD image sensor or a CMOS image sensor, for example. In the first embodiment, the image sensor is a single-chip image sensor having a primary-color Bayer array. Note that the image sensor is not limited thereto. Various other image sensors may also be used. An image formed on the image sensor through the imaging lens is photoelectrically converted corresponding to each pixel of the image sensor to generate an analog signal. The analog signal is converted into a digital signal by the A/D conversion section, and the digital signal (image signal) is output to the OB processing section 110.

The OB processing section 110 determines the zero level of the image signal based on the image signal obtained from the light-blocking area of the image sensor, subtracts the zero level from the image signal obtained from the exposure area of the image sensor, and outputs the zero level-corrected image signal (hereinafter appropriately referred to as "image") to the isolated point noise correction processing section 120.

The isolated point noise correction processing section 120 performs an isolated point noise detection process and an isolated point noise correction process on the input image, and outputs the image subjected to the isolated point noise correction process to the random noise reduction processing section 130. The details of the isolated point noise detection process and the isolated point noise correction process are described later.

The random noise reduction processing section 130 performs an edge-preserving adaptive noise filtering process and the like on the input image to reduce random noise, and outputs the image (from which random noise has been reduced) to the WB processing section 140.

The WB processing section 140 performs a white balance correction process that multiplies the R signal and the B signal of the input image by a white balance coefficient, and outputs the image subjected to the white balance correction process to the demosaicing processing section 150.

The demosaicing processing section 150 performs an interpolation process on the input Bayer-array image to generate a color image (color image signal), and outputs the color image to the CMS processing section 160. For example, the interpolation process interpolates the pixel value (signal value) of the processing target attention pixel using the pixel value of its peripheral pixels. The term "color image" used herein refers to an image in which each pixel has an R (red) pixel value, a G (green) pixel value, and a B (blue) pixel value.

The CMS processing section 160 performs a color conversion process on the input color image so that the display image has the desired color, and outputs the color image subjected to the color conversion process to the gamma processing section 170.

The gamma processing section 170 performs a gamma conversion process on the input color image corresponding to the grayscale characteristics of the display device, and outputs the color image subjected to the gamma conversion process to the edge enhancement processing section 180.

The edge enhancement processing section 180 performs an edge enhancement process that extracts an edge component from the input color image, multiplies the edge component by the desired gain, and adds the resulting edge component to the color image, and outputs the color image subjected to the edge enhancement process to the output section 190.

The output section 190 is a liquid crystal display or an organic EL display, for example. The output section 190 displays the input color image to the user so that the color image can be observed as image information.

2.2. Isolated Point Noise Correction Processing Section

Figure 2:
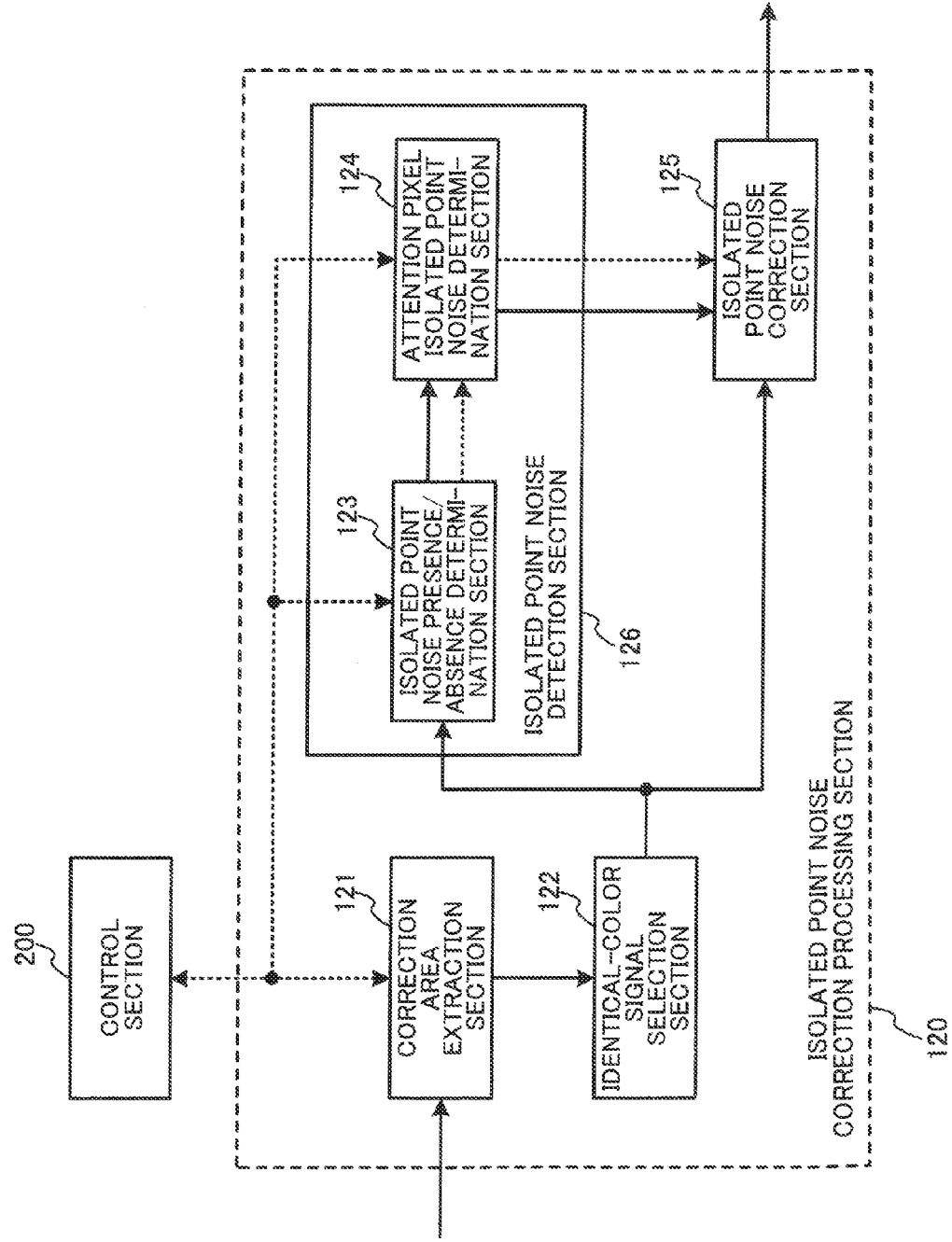
FIG. 2 illustrates a detailed configuration example of an isolated point noise correction processing section according to a first embodiment.

FIG. 2 illustrates a detailed configuration example of the isolated point noise correction processing section 120. The isolated point noise correction processing section 120 includes a correction area extraction section 121, an identical-color signal selection section 122, an isolated point noise correction section 125 (isolated point pixel noise correction processing section), and an isolated point noise detection section 126. The point noise detection section 126 includes an isolated point noise presence/absence determination section 123 (isolated point noise area detection section) and an attention pixel isolated point noise determination section 124.

The position and the size of the extracted area for correcting isolated point noise is supplied to the correction area extraction section 121 from the control section 200 as the process parameters. A first coefficient Co1 for determining whether or not an isolated point noise pixel is included within a pixel area that corresponds to an identical color and has been selected by the identical-color signal selection section 122 is supplied to the isolated point noise presence/absence determination section 123 from the control section 200 as the process parameter. When the isolated point noise presence/absence determination section 123 has determined that an isolated point noise pixel is included within the pixel area that corresponds to an identical color, a second coefficient Co2 for determining whether or not the pixel value of the attention pixel (i.e., a pixel situated at the center of the pixel area) within the pixel area that corresponds to an identical color is isolated point noise is supplied to the isolated point noise presence/absence determination section 123 from the control section 200 as the process parameter.

Figure 3A:
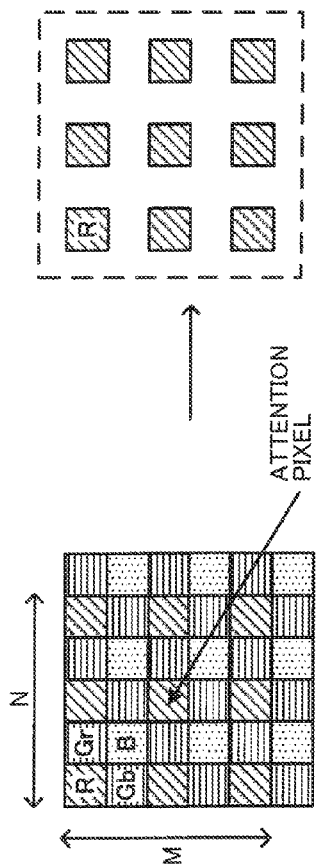
FIGS. 3A to 3D are views illustrating a process performed by a correction area extraction section.

The image output from the OB processing section 110 is input to the correction area extraction section 121. The correction area extraction section 121 extracts the attention pixel and a given N×M (N and M are natural numbers) pixel area situated around the attention pixel (processing target area) based on the process parameter from the control section 200. Note that an example in which the N×M pixel area is a 5×5 pixel area (see FIG. 3A) is described below. FIG. 3A illustrates an example in which the pixel value of the upper left pixel of the N×M pixel area is the R signal. Note that the pixel value of the upper left pixel of the N×M pixel area may be the Gr signal, the B signal, or the Gb signal. The G signal is divided into the Gr signal and the Gb signal for convenience of the process performed by the isolated point noise presence/absence determination section 123, the process performed by the attention pixel isolated point noise determination section 124, and the process performed by the isolated point noise correction section 125. Note that the configuration is not limited thereto. The Gr signal and the Gb signal may collectively be handled as the G signal, and the process may be performed using a number of pixels differing from that of the R signal and the B signal.

Figure 3B:
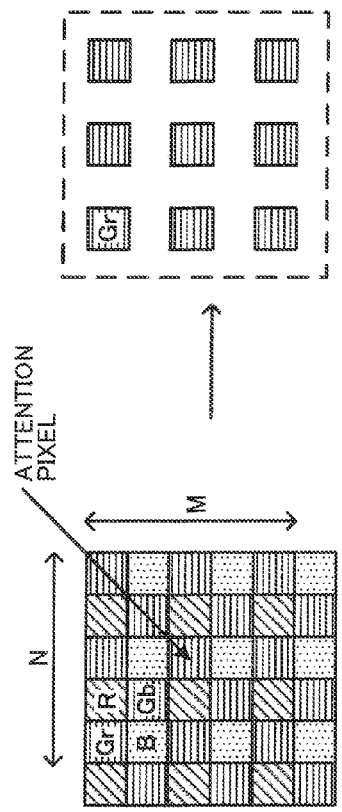
Figure 3C:
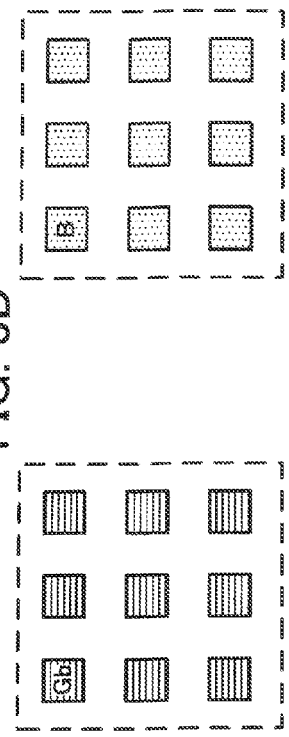
Figure 3D:
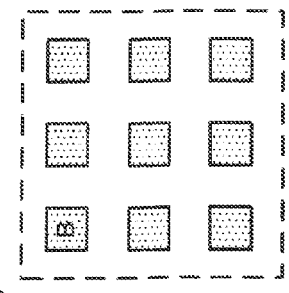

The N×M pixel area extracted by the correction area extraction section 121 is input to the identical-color signal selection section 122. The identical-color signal selection section 122 selects the pixel values of the pixels that correspond to a color identical to that of the attention pixel from the N×M pixel area, and outputs the selected pixel values to the isolated point noise presence/absence determination section 123. The identical-color signal selection section 122 outputs the pixel value of the attention pixel to the isolated point noise correction section 125. For example, when the pixel value of the attention pixel is an R signal value, the R signal values of 3×3 pixels included within the N×M pixel area are output (see FIG. 3A). When the pixel value of the attention pixel is a Gr signal value, the Gr signal values of 3×3 pixels are output (see FIG. 3B). When the pixel value of the attention pixel is a Gb signal value, the Gb signal values of 3×3 pixels are output (see FIG. 3C). When the pixel value of the attention pixel is a B signal value, the B signal values of 3×3 pixels are output (see FIG. 3D).

Figure 4:
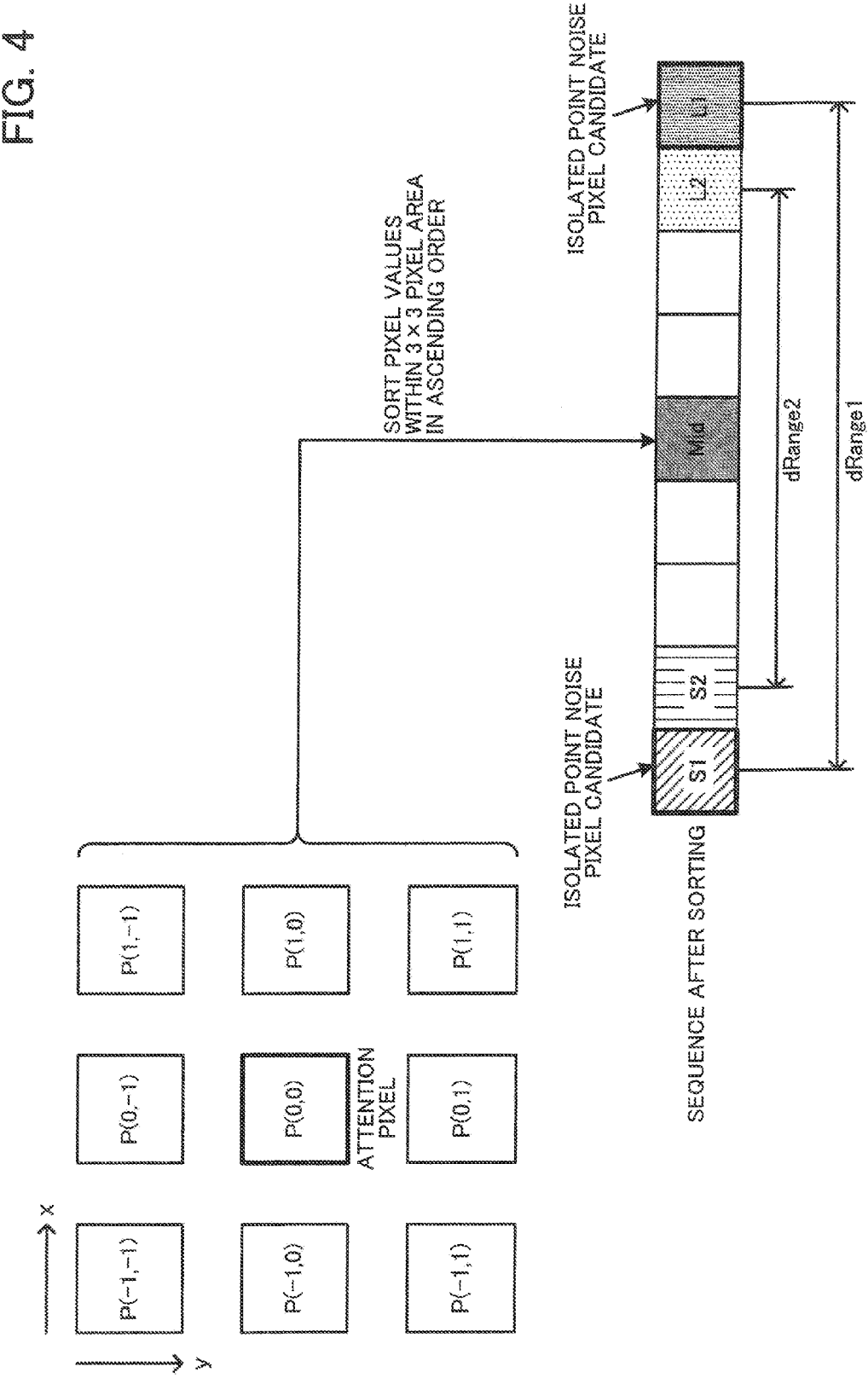
FIG. 4 is a view illustrating a first dynamic range and a second dynamic range.

As illustrated in FIG. 4, the isolated point noise presence/absence determination section 123 one-dimensionally sorts (arranges) the pixel values of the 3×3 pixels that correspond to an identical color in ascending order, and stores the pixel values in a memory (not illustrated in the drawings). In FIG. 4, S1 is the smallest value among the pixel values that correspond to an identical color, S2 is the second smallest value that is larger than the smallest value S1, Mid is a middle value, L1 is the largest value among the pixel values that correspond to an identical color, and L2 is the second largest value that is smaller than the largest value L1. Although an example in which the pixel values are sorted in ascending order is described below, the pixel values may be sorted in descending order. Although an example in which the middle value is a median value is described below, the middle value may be an arbitrary value between the value S2 and the value L2. Note that the median value refers to the center value among the pixel values that are arranged in ascending or descending order. For example, the median value refers to the fifth value among nine pixel values that are arranged in ascending or descending order.

When only one isolated point noise is included within the 3×3 pixels, the smallest value S1 or the largest value L1 is a candidate for the isolated point noise. In order to determine whether the smallest value S1 or the largest value L1 is the isolated point noise, the isolated point noise presence/absence determination section 123 calculates the difference between the largest value L1 and the smallest value S1 as a first dynamic range dRange1 (first index value), and calculates the difference between the value L2 and the value S2 as a second dynamic range dRange1 (second index value). The first dynamic range DRange1 is an index value that represents the range from the smallest value S1 to the largest value L1 among the pixel values within the 3×3 pixel local area, and the second dynamic range DRange2 is an index value that represents the range from the value S2 (smallest value) to the value L2 (largest value) among the pixel values within the 3×3 pixel local area excluding the largest value L1 and the smallest value S1.

Figure 5:
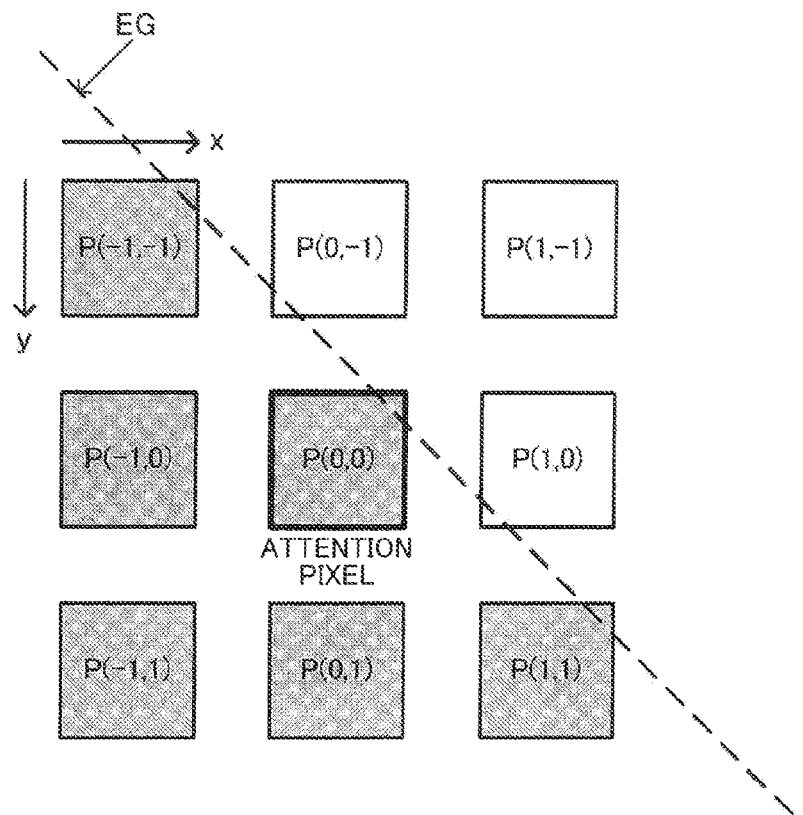
FIG. 5 is a view illustrating a process performed by an isolated point noise determination section and a process performed by an attention pixel isolated point noise determination section.

In FIG. 5, an edge EG is present within the 3×3 pixel local area. If only one pixel value that is significantly larger or smaller than the remaining pixel values is present, the one pixel value is considered to be isolated point noise. Therefore, when isolated point noise is not present within the 3×3 pixel local area, at least two pixels among the 3×3 pixels have a large pixel value at an almost equal level (see the white pixels in FIG. 5), and at least two pixels among the 3×3 pixels have a small pixel value at an almost equal level (see the hatched pixels in FIG. 5). In this case, the difference between the first dynamic range DRange1 and the second dynamic range DRange2 is small (see FIG. 7B). In FIG. 7B, the difference between the middle value Mid and the value L4 represents the difference in pixel value due to the edge. When no edge is present within the 3×3 pixel local area (i.e., flat), no difference in pixel value is observed, and the difference between the first dynamic range DRange1 and the second dynamic range DRange2 is small.

Therefore, the isolated point noise presence/absence determination section 123 compares the first dynamic range DRange1 with the second dynamic range DRange2 that is multiplied by the coefficient Co1 from the control section 200 (i.e., the value Co1×dRange2), and determines that the largest value L1 or the smallest value S1 is isolated point noise when the first dynamic range DRange1 is larger than the value Co1×dRange2. Note that the first dynamic range DRange1 and the second dynamic range DRange2 may be compared using another method. For example, a value obtained by subtracting the second dynamic range dRange2 from the first dynamic range dRange1 may be compared with a given threshold value to determine whether or not the largest value L1 or the smallest value S1 is isolated point noise.

The isolated point noise presence/absence determination section 123 outputs the determination result (isolated point noise presence/absence determination information) as to whether or not a pixel value among the pixel values of the 3×3 pixels that correspond to an identical color is isolated point noise, to the attention pixel isolated point noise determination section 124. When the isolated point noise presence/absence determination section 123 has determined that a pixel value among the pixel values of the 3×3 pixels that correspond to an identical color is isolated point noise, the isolated point noise presence/absence determination section 123 outputs the middle value Mid, the second dynamic range dRange2, and the pixel value of the attention pixel to the attention pixel isolated point noise determination section 124.

The attention pixel isolated point noise determination section 124 determines whether or not the attention pixel is isolated point noise based on the middle value Mid, the second dynamic range dRange2, and the pixel value of the attention pixel when the isolated point noise presence/absence determination information represents that isolated point noise is present. Specifically, the attention pixel isolated point noise determination section 124 determines that the attention pixel is isolated point noise when the absolute difference value between the middle value Mid and the pixel value of the attention pixel P(0, 0) (pixel value P(0, 0)) (i.e., value |Mid−P(0, 0)|) is larger than a threshold value (see FIG. 7C). Note that the pixel value of the attention pixel P(0, 0) may be referred to as "pixel value P(0, 0)". This similarly applies to other pixels. The threshold value is a value obtained by multiplying the second dynamic range dRange2 by the second coefficient Cot supplied from the control section 200 (i.e., value Co2×dRange2).

When the value |Mid−P(0, 0)| is larger than the value Co2×dRange2, it is determined that the pixel value of the attention pixel P(0, 0) is larger than the second dynamic range DRange2 that represents the range of the pixel values within the 3×3 pixel local area excluding the largest value L1 and the smallest value S1. Therefore, when the value |Mid−P(0, 0)| is larger than the value Co2×dRange2, it is likely that the attention pixel has the largest value L1 or the smallest value S1, and it may be determined that the attention pixel is isolated point noise. The attention pixel isolated point noise determination section 124 outputs an isolated point noise correction flag (determination result) and the middle value Mid to the isolated point noise correction section 125. The isolated point noise correction flag is set to "ON" (correction) (e.g., logic level "1") when it has been determined that the attention pixel is isolated point noise. The isolated point noise correction flag is set to "OFF" (no correction) (e.g., logic level "0") when it has been determined that the attention pixel is not isolated point noise.

Figure 6:
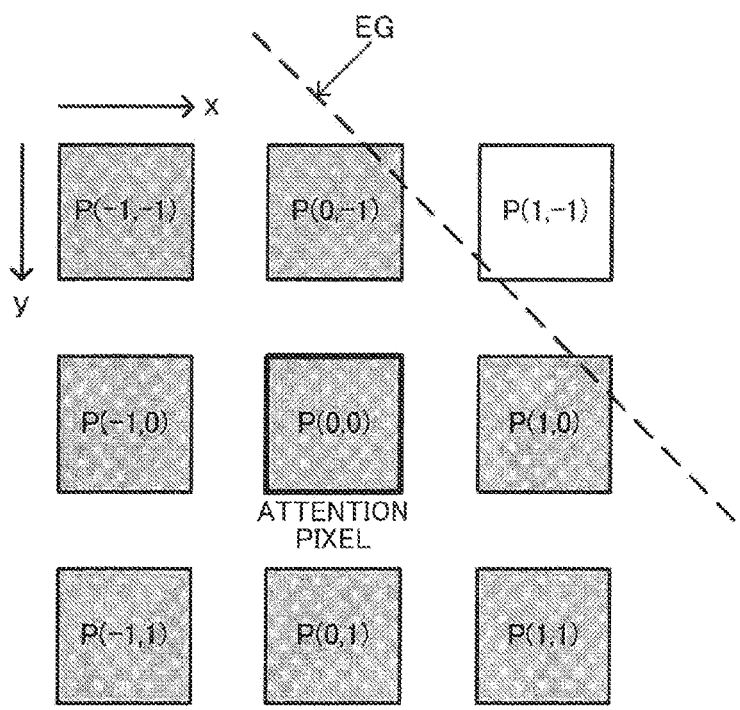
FIG. 6 is a view illustrating a process performed by an isolated point noise determination section and a process performed by an attention pixel isolated point noise determination section.

Note that the edge EG may be present between one corner pixel among the 3×3 pixels and the remaining eight pixels (see FIG. 6). In this case, since only the pixel value of the one corner pixel is significantly larger or smaller than the remaining pixel values, the isolated point noise presence/absence determination section 123 determines that the one corner pixel is isolated point noise. However, since the value |Mid−P(0, 0)| is smaller than the value Co2×dRange2 (see FIG. 7D), the attention pixel isolated point noise determination section 124 determines that the attention pixel is not isolated point noise, and isolated point noise is not detected. Specifically, even when apparent isolated point noise occurs within 3×3 pixels due to the edge EG, it is possible to determine whether or not the apparent isolated point noise is the actual isolated point noise.

The pixel value of the attention pixel output from the identical-color signal selection section 122, and the middle value Mid and the isolated point noise correction flag output from the attention pixel isolated point noise determination section 124 are input to the isolated point noise correction section 125. The isolated point noise correction section 125 outputs the middle value Mid as the pixel value of the attention pixel when the isolated point noise correction flag is set to "ON", and outputs the pixel value of the attention pixel directly when the isolated point noise correction flag is set to "OFF". The isolated point noise correction process on the attention pixel is thus completed. Note that the pixel value of the attention pixel need not necessarily be corrected using the middle value Mid. The pixel value of the attention pixel may be corrected using a value obtained from the pixel values S1 to L1 included within the 3×3 pixel local area.

2.3. Details of Isolated Point Noise Correction Process

The isolated point noise correction process is described in detail below with reference to FIGS. 7A to 7D. FIGS. 7A to 7D are schematic views in which the pixel values included within the 3×3 pixel local area (see FIG. 5) are arranged in ascending order from the left. The first dynamic range dRange1 is the difference between the pixel value L1 and the pixel value S1, and the second dynamic range dRange2 is the difference between the pixel value L2 and the pixel value S2. A change in pixel value within the local area is represented using the first dynamic range dRange1 and the second dynamic range dRange2.

Figure 7A:
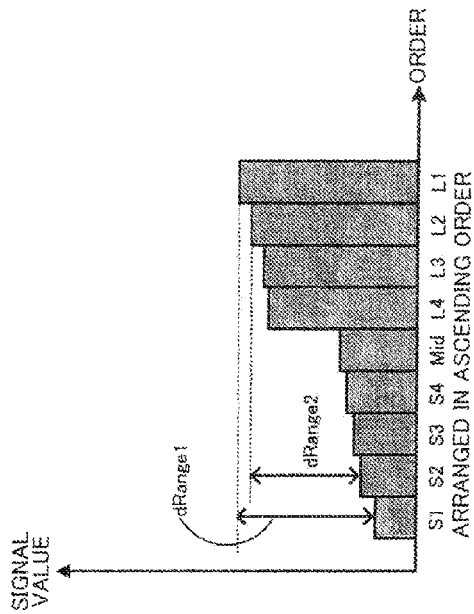
FIGS. 7A to 7D are views illustrating a process performed by an isolated point noise determination section and a process performed by an attention pixel isolated point noise determination section.
Figure 7C:
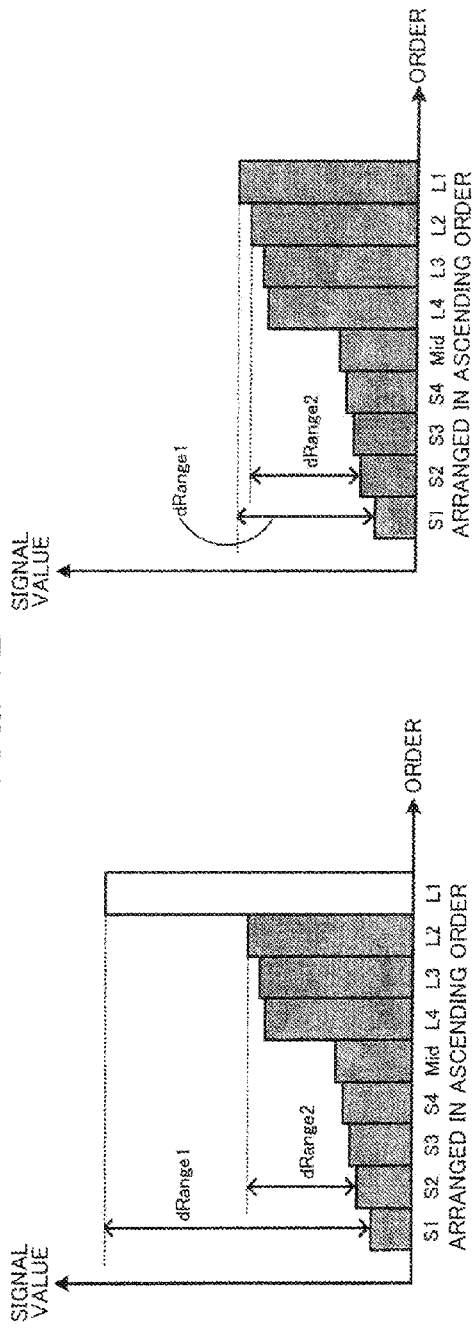
Figure 7B:
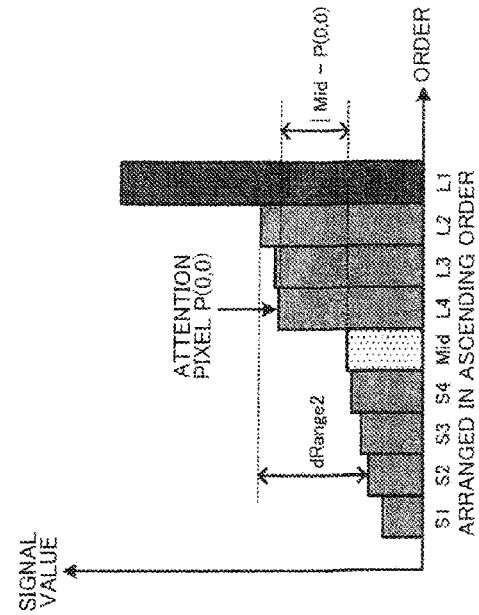

FIG. 7A is a schematic view when one isolated point noise is present within the local area, and FIG. 7B is a schematic view when no isolated point noise is present within the local area. The hatched pixel values represent a pixel value that is relatively smaller than isolated point noise, and the pixel value that is not hatched represents a large pixel value that corresponds to isolated point noise.

When an edge (e.g., the edge EG in FIG. 5) is present within the local area, the hatched pixel values are divided into two groups. In FIG. 7A, eight pixel values S1 to L2 are divided into a first group (S1 to Mid) and a second group (L4 to L2). In FIG. 7B, nine pixel value S1 to L1 are divided into a first group (S1 to Mid) and a second group (L4 to L1). As illustrated in FIG. 7B, the difference between the first dynamic range dRange1 and the second dynamic range dRange2 is small when isolated point noise is not present. Specifically, since the first dynamic range dRange1 and the second dynamic range dRange2 change adaptively with respect to the gap in pixel value (i.e., the difference between the first group (S1 to Mid) and the second group (L4 to L1)) due to the edge, the first dynamic range dRange1 and the second dynamic range dRange2 are not affected by the edge, and are almost equal. As illustrated in FIG. 7A, the difference between the first dynamic range dRange1 and the second dynamic range dRange2 is large when one isolated point noise is present. Specifically, it is possible to determine whether or not isolated point noise is present within the local area without being affected by the presence of an edge by detecting the difference between the first dynamic range dRange1 and the second dynamic range dRange2.

Although an example in which whether or not one isolated point noise is present within the local area is determined using the first dynamic range dRange1 and the second dynamic range dRange2 (=L2−S2) has been described above, the configuration is not limited thereto. For example, the difference between the pixel value L1 and the pixel value S2, and the difference between the pixel value L2 and the pixel value S1 may be calculated, and the difference between the pixel value L1 and the pixel value S2, or the difference between the pixel value L2 and the pixel value S1, whichever is smaller, may be used as the second dynamic range dRange2. Alternatively, whether or not two or more isolated point noises are present within the local area may be determined. For example, whether or not two or more isolated point noises are present within the local area may be determined using the first dynamic range dRange1 and a third dynamic range dRange3 (=L3−S3). Note that it is possible to reduce the probability that an edge that is present in the periphery of the local area is erroneously determined to be isolated point noise by determining whether or not one isolated point noise is present within the local area using the first dynamic range dRange1 and the second dynamic range dRange2.

Figure 7D:
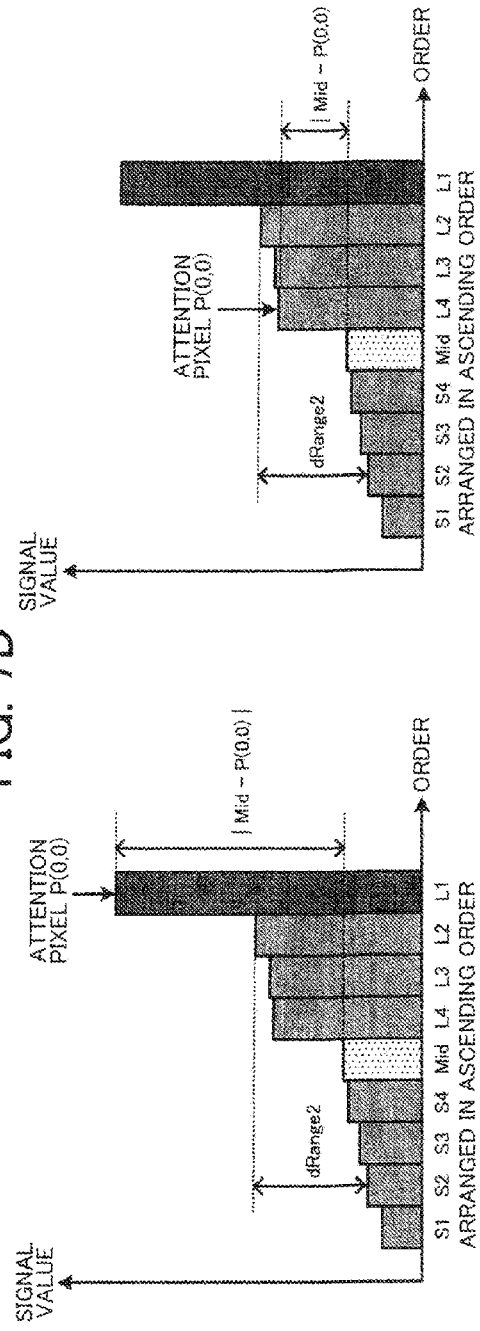

FIG. 7C is a schematic view when the attention pixel is isolated point noise, and FIG. 7D is a schematic view when the attention pixel is not isolated point noise. Whether or not the attention pixel is isolated point noise is determined by determining whether or not the absolute difference value |Mid−P(0, 0)| between the middle value Mid (median value) among the nine pixel values S1 to L1 and the pixel value of the attention pixel P(0, 0) is within the second dynamic range dRange2.

Specifically, when the attention pixel (pixel value: P(0, 0)) is not isolated point noise, the absolute difference value |Mid−P(0, 0)| is within the second dynamic range dRange2 (see FIG. 7D). This is because the second dynamic range dRange2 represents the difference in pixel value due to an edge present within the local area, and the absolute difference value between the middle value Mid and the pixel value of the attention pixel P(0, 0) within the second dynamic range dRange2 is smaller than the second dynamic range dRange2. Since the second dynamic range dRange2 changes adaptively with respect to an edge, the above relationship is satisfied regardless of the presence or absence of an edge. When the attention pixel (pixel value P(0, 0)) is isolated point noise, the absolute difference value |Mid−P(0, 0)| is larger than the second dynamic range dRange2. It is possible to determine whether or not the attention pixel is isolated point noise by comparing the absolute difference value |Mid−P(0, 0)| with the second dynamic range dRange2 as described above. It is also possible to accurately detect whether or not isolated point noise is present at the attention pixel even when an edge is present, by performing the two-step determination process described above with reference to FIGS. 7A to 7D.

Figure 8:
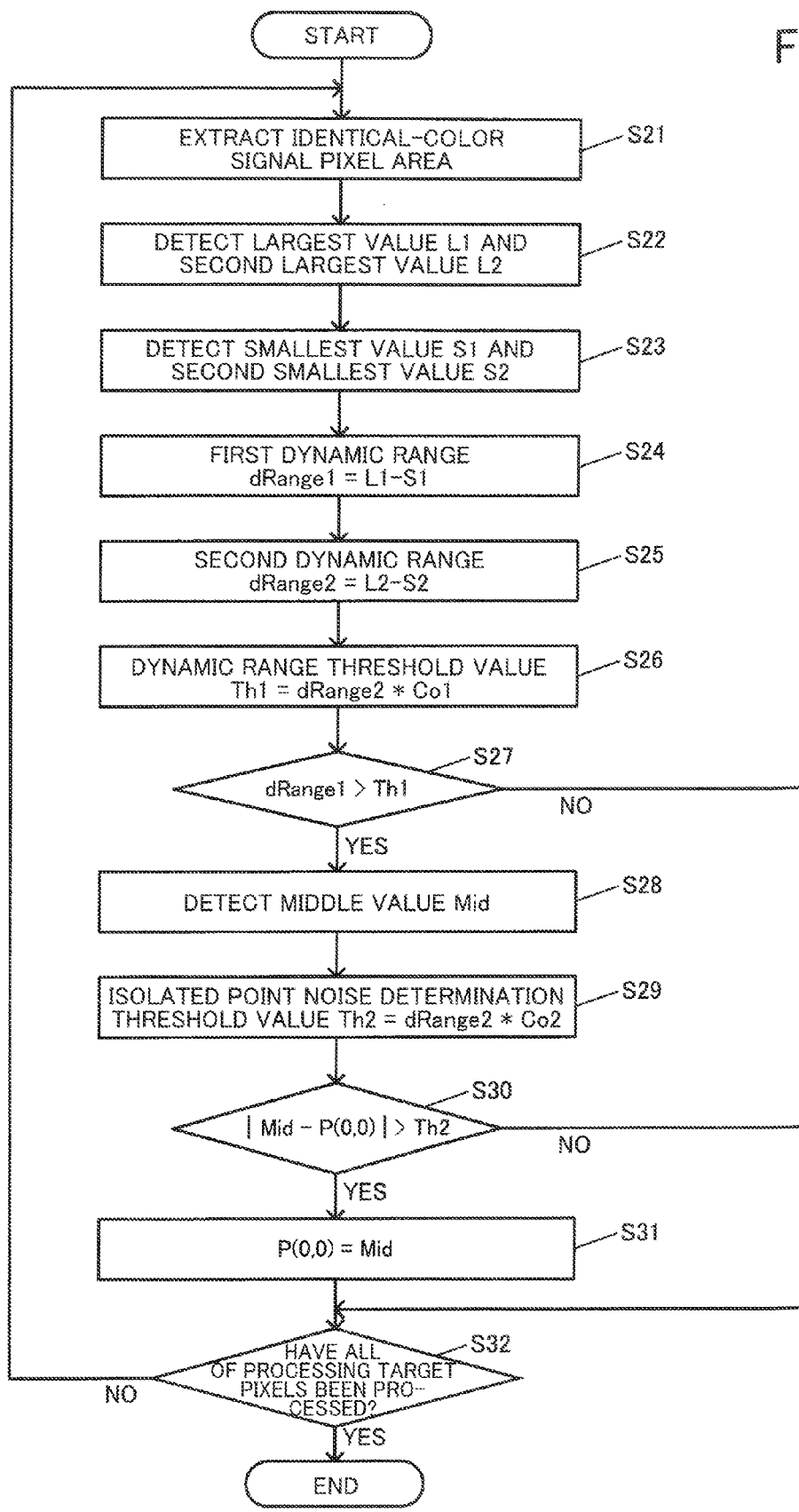
FIG. 8 is a flowchart illustrating an isolated point noise correction process.

FIG. 8 is a flowchart illustrating the isolated point noise correction process performed by the isolated point noise correction processing section 120. When the isolated point noise correction process has started, the correction area extraction section 121 extracts the pixel values within the local area (i.e., the attention pixel and the pixels situated around the attention pixel (N×M pixels)) (i.e., processing target area) from the input image, and the identical-color signal selection section 122 selects the pixel values (3×3 pixels) of the pixels that correspond to a color identical to that of the attention pixel from the pixel values within the local area (step S21).

The isolated point noise presence/absence determination section 123 detects the largest value L1 and the second largest value L2 from the selected pixel values (step S22). The isolated point noise presence/absence determination section 123 detects the smallest value S1 and the second smallest value S2 from the selected pixel values (step S23). The isolated point noise presence/absence determination section 123 subtracts the smallest value S1 from the largest value L1 to calculate the first dynamic range dRange1 (step S24). The isolated point noise presence/absence determination section 123 subtracts the second smallest value S2 from the second largest value L2 to calculate the second dynamic range dRange2 (step S25). The isolated point noise presence/absence determination section 123 multiplies the second dynamic range dRange2 by the coefficient Co1 set by the control section 200 to calculate a dynamic range threshold value Th1 (step S26).

The isolated point noise presence/absence determination section 123 determines whether or not the first dynamic range dRange1 is larger than the threshold value Th1 (step S27). When the isolated point noise presence/absence determination section 123 has determined that the first dynamic range dRange1 is equal to or smaller than the threshold value Th1, a step S32 is performed. When the isolated point noise presence/absence determination section 123 has determined that the first dynamic range dRange1 is larger than the threshold value Th1, the isolated point noise presence/absence determination section 123 detects the middle value Mid (step S28).

The attention pixel isolated point noise determination section 124 multiplies the second dynamic range dRange2 by the coefficient Co2 set by the control section 200 to calculate an isolated point noise determination threshold value Th2 (step S29). The attention pixel isolated point noise determination section 124 determines whether or not the absolute difference value |Mid−P(0, 0)| between the middle value Mid and the pixel value of the attention pixel P(0, 0) is larger than the threshold value Th2 (step S30). When the attention pixel isolated point noise determination section 124 has determined that the absolute difference value |Mid−P(0, 0)| is equal to or smaller than the threshold value Th2, the step S32 is performed. When the attention pixel isolated point noise determination section 124 has determined that the absolute difference value |Mid−P(0, 0)| is larger than the threshold value Th2, the attention pixel isolated point noise determination section 124 replaces the pixel value of the attention pixel P(0, 0) with the middle value Mid (step S31).

Whether or not all of the processing target pixels, have been processed is determined (step S32). When it has been determined that all of the processing target pixels have not been processed, the step S21 is performed again. When it has been determined that all of the processing target pixels have been processed, the process is terminated.

Although an example in which the isolated point noise correction process is performed on the image captured by the image sensor having a primary-color Bayer array has been described above, the configuration is not limited thereto. Specifically, the isolated point noise correction process can also be performed on an image captured by a primary-color three-chip image sensor, a complementary-color single-ship image sensor, or a frame-sequential monochrome single-chip image sensor, as long as it is possible to define the local area that consists of the attention pixel and the pixels that are situated around the attention pixel and correspond to a color identical to that of the attention pixel.

According to the first embodiment, the image processing device includes the isolated point noise detection section 126 that detects isolated point noise that is included in an image, and the isolated point noise correction section 125 that corrects the isolated point noise detected by the isolated point noise detection section 126 (see FIG. 2). The isolated point noise detection section 126 includes the isolated point noise presence/absence determination section 123 and the attention pixel isolated point noise determination section 124. As described above with reference to FIG. 4 and the like, the isolated point noise presence/absence determination section 123 determines whether or not the isolated point noise is included within a given area (local area) based on a first index value dRange1 (first dynamic range) that represents the range of first to nth pixel values S1 to L1, and a second index value dRange2 (second dynamic range) that represents the range of a pixel value group S2 to L2. The first to nth pixel values S1 to L1 are obtained by arranging (sorting) the pixel values of the pixels P(−1, −1) to P(1, 1) within the given area in ascending or descending order, the given area including the attention pixel P(0, 0) that is the isolated point noise detection target. The pixel value group S2 to L2 is obtained by excluding at least one of the first pixel value S1 and the nth pixel value L1 from the first to nth pixel values S1 to L1. The attention pixel isolated point noise determination section 124 determines whether or not the attention pixel P(0, 0) is a pixel that corresponds to the isolated point noise when it has been determined that the isolated point noise is included within the given area.

According to this configuration, it is possible to accurately detect whether or not the isolated point noise is present within the given area even when the image shows a local change in pixel value (e.g., an image of an edge area), by calculating the first index value dRange1 and the second index value dRange2 corresponding to the pixels P(−1, −1) to P(1, 1) within the given area. Specifically, since the first index value dRange1 and the second index value dRange2 change adaptively with respect to a local change in pixel value (as described above with reference to FIG. 7A and the like), the isolated point noise can be detected without being affected by a local change in pixel value. Since whether or not the attention pixel is the isolated point noise is determined only when the isolated point noise has been detected within the local area, the isolated point noise detection accuracy with respect to the attention pixel can be improved.

Note that the index value (first index value and second index value) that represents the pixel value range is an index value that represents the range of the pixel value distribution, and increases as the range of the pixel value distribution increases. For example, the index value increases as the largest value or the smallest value of the pixel value distribution increases. The index value increases in a local area that includes an edge since the range of the pixel value distribution increases as compared with a flat local area that does not include an edge. Specifically, the index value changes adaptively with respect to a change in the range of the local pixel value distribution due to an edge or the like.

The isolated point noise presence/absence determination section 123 may calculate the difference |L1−S1| between the first pixel value S1 and the nth pixel value L1 as the first index value dRange1, and calculate the difference |L2−S2| between the largest value and the smallest value among the pixel values S2 to L2 included in the pixel value group as the second index value dRange2.

According to this configuration, it is possible to calculate the first index value dRange1 that represents the range of the first to nth pixel values S1 to L1, and the second index value dRange2 that represents the range of the pixel values S2 to L2 included in the pixel value group. Since a gap in pixel value due to an edge is included between the largest value and the smallest value, the first index value dRange1 and the second index value dRange2 change adaptively corresponding to the presence or absence of an edge.

The pixel value group may include the second to (n−1)th pixel values S2 to L2 among the first to nth pixel values L1 to S1. The isolated point noise presence/absence determination section 123 may calculate the difference |L2−S2| between the second pixel value S2 and the (n−1)th pixel value L2 included in the pixel value group as the second index value dRange2.

According to this configuration, it is possible to detect isolated point noise irrespective of whether the isolated point noise is white noise (high-brightness noise) or black noise (low-brightness noise). Note that the pixel value group may consist of the first to (n−1)th pixel values S1 to L2, and the isolated point noise presence/absence determination section 123 may calculate the second index value dRange2=|L2−S1|. In this case, since the pixel value L1 is the largest value when the pixel values are arranged in ascending order, it is possible to detect white isolated point noise. Alternatively, the pixel value group may consist of the second to nth pixel values S2 to L1, and the isolated point noise presence/absence determination section 123 may calculate the second index value dRange2=|L1−S2|. In this case, since the pixel value S1 is the smallest value when the pixel values are arranged in ascending order, it is possible to detect black isolated point noise. The pixel value group may be obtained by excluding two or more pixel values on the largest value side (or the smallest value side) from the first to nth pixel values S1 to L1.

3. Second Embodiment 3.1. Isolated Point Noise Correction Processing Section

Figure 9:
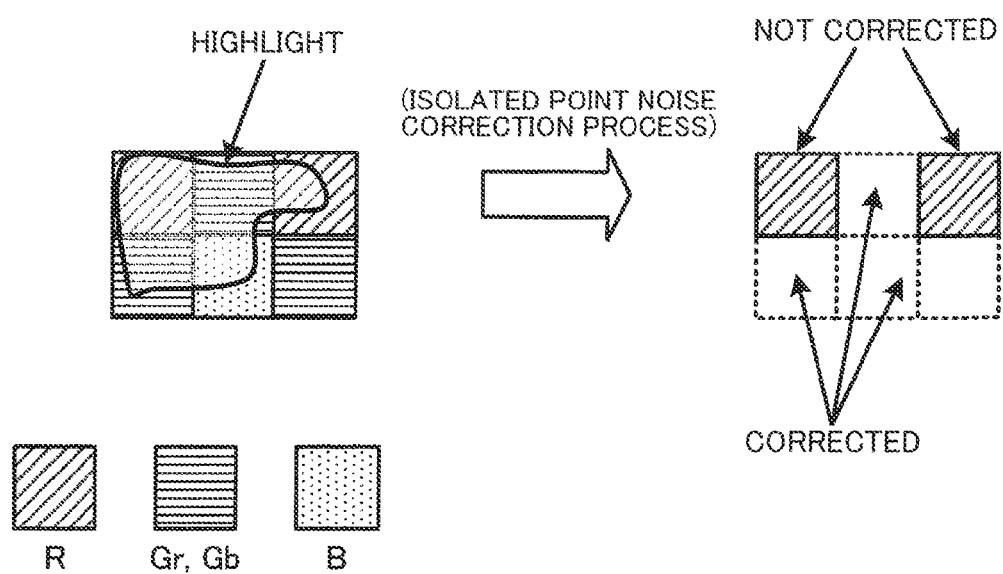
FIG. 9 is a view illustrating a highlight correction process.

In FIG. 9, a highlight having a given size is formed on a primary-color single-chip image sensor. When the isolated point noise correction process is performed in such a case, the pixels of the highlight may be erroneously determined to be isolated point noise, and may be overcorrected.

For example, five adjacent pixels are included in the highlight area in which brightness saturation occurs. In the example illustrated in FIG. 9, the five pixels included in the highlight area correspond to two R signals, one Gr signal, one Gb signal, and one B signal. The isolated point noise correction process described above in connection with the first embodiment detects isolated point noise when only one pixel value that is significantly larger or smaller than the remaining pixel values is present within the 3×3 pixel local area. Therefore, when the isolated point noise correction process is performed on the five pixels included in the highlight area, the R signals are not detected as isolated point noise, and the Gr signal, the Gb signal, and the B signal are detected as isolated point noise. In this case, only the R signals remain uncorrected, and the white highlight area is reproduced as a red spot area. In the second embodiment, a process that corrects such overcorrection due to a highlight is performed.

Figure 10:
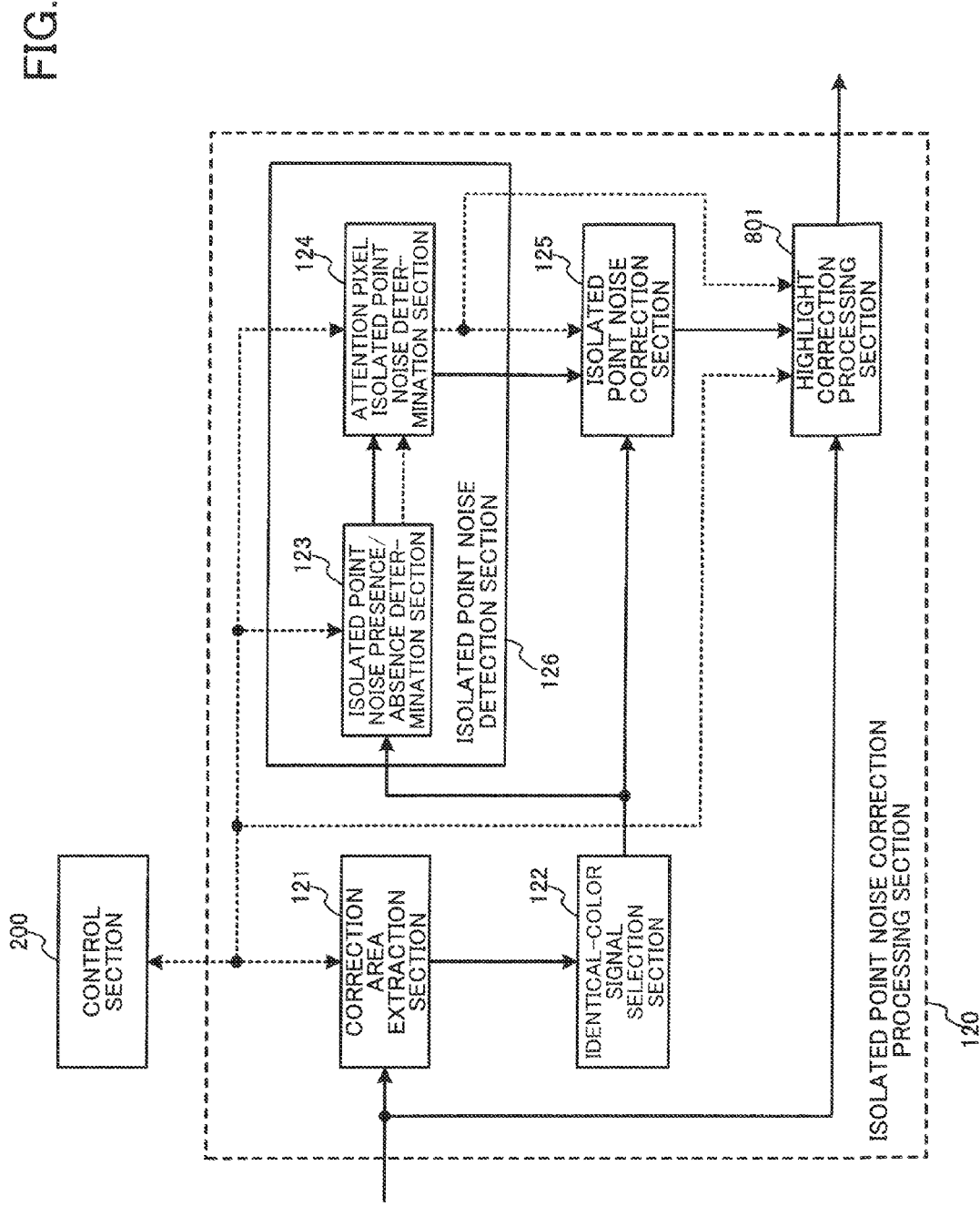
FIG. 10 illustrates a detailed configuration example of an isolated point noise correction processing section according to a second embodiment.

FIG. 10 illustrates a detailed configuration example of an isolated point noise correction processing section 120 according to the second embodiment. The isolated point noise correction processing section 120 illustrated in FIG. 10 includes a correction area extraction section 121, an identical-color signal selection section 122, an isolated point noise correction section 125 (isolated point noise pixel correction processing section), an isolated point noise detection section 126, and a highlight correction processing section 801 (highlight detection correction processing section and overcorrection correction processing section). The isolated point noise detection section 126 includes an isolated point noise presence/absence determination section 123 (isolated point noise area detection section), and an attention pixel isolated point noise determination section 124. Note that the same elements as those described above in connection with the first embodiment are respectively indicated by the same reference signs, and description thereof is appropriately omitted.

An example in which the image sensor is a single-chip image sensor having a primary-color Bayer array. Note that the configuration is not limited thereto. Various other image sensors may also be used.

The isolated point noise correction flag output from the attention pixel isolated point noise determination section 124, the isolated point noise correction result output from the isolated point noise correction section 125, the white balance coefficient output from the control section 200, and the image (that is not subjected to the isolated point noise correction process) output from the OB processing section 110, are input to the highlight correction processing section 801. The highlight correction processing section 801 determines whether or not the pixel for which the isolated point noise correction flag is set to "ON" (i.e., the pixel that has been subjected to the isolated point noise correction process) is a pixel within the highlight area. When it has been determined that the pixel for which the isolated point noise correction flag is set to "ON" is a pixel within the highlight area, the highlight correction processing section 801 outputs the original pixel value instead of the corrected pixel value.

3.2. Highlight Correction Processing Section

Figure 11:
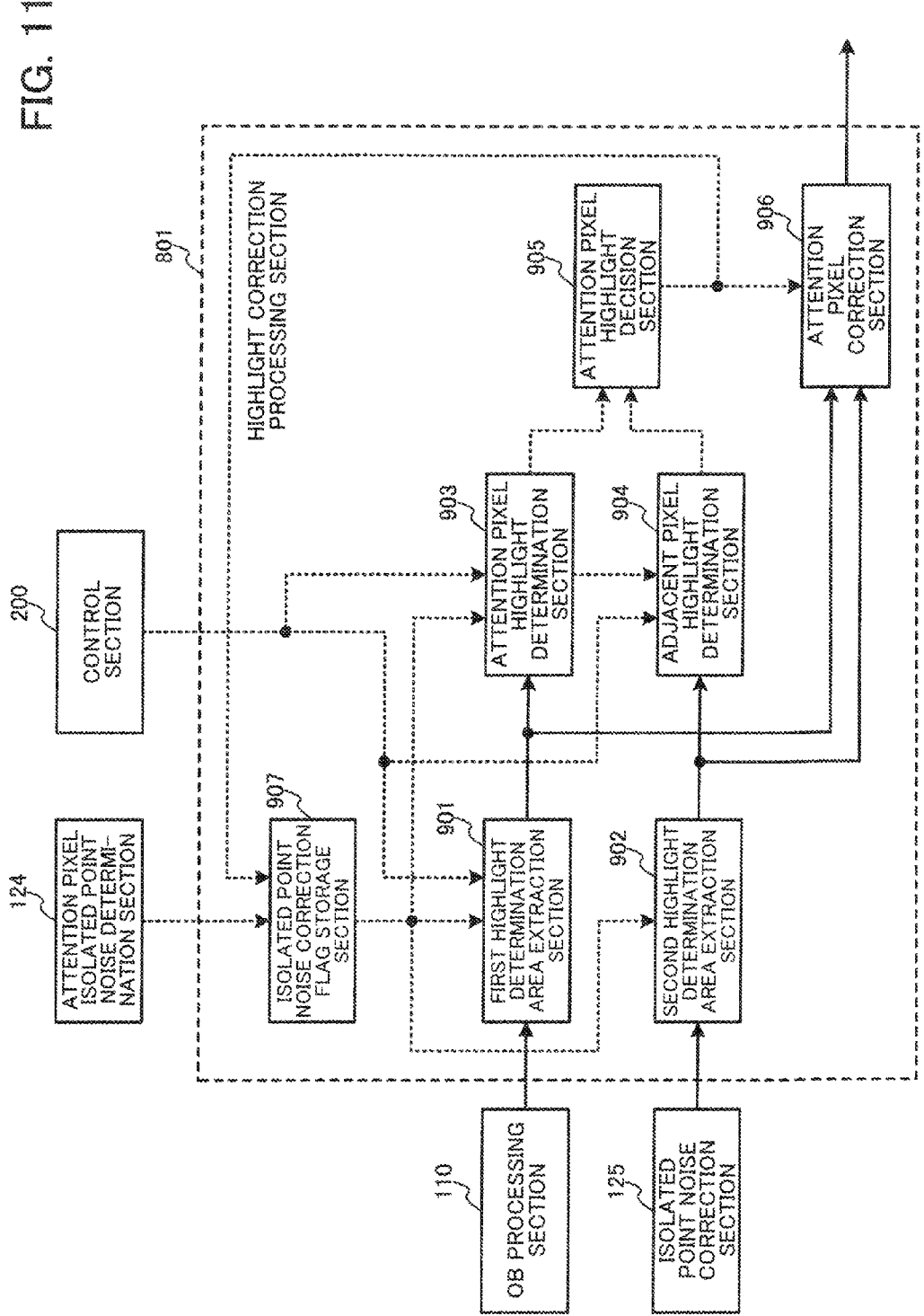
FIG. 11 illustrates a detailed configuration example of a highlight correction processing section.

FIG. 11 illustrates a detailed configuration example of the highlight correction processing section 801. The highlight correction processing section 801 includes a first highlight determination area extraction section 901 (white balance correction processing section), a second highlight determination area extraction section 902, an attention pixel highlight determination section 903, an adjacent pixel highlight determination section 904, an attention pixel highlight decision section 905, an attention pixel correction processing section 906, and an isolated point noise correction flag storage section 907.

The isolated point noise correction flag output from the attention pixel isolated point noise determination section 124 is input to the isolated point noise correction flag storage section 907. The isolated point noise correction flags corresponding to the number of necessary lines are stored in the isolated point noise correction flag storage section 907 until they correspond to the area extracted by the first highlight determination area extraction section 901 and the area extracted by the second highlight determination area extraction section 902.

The image that is output from the OB processing section 110 and has not been subjected to the isolated point noise correction process, the isolated point noise correction flag output from the isolated point noise correction flag storage section 907, and the white balance coefficient output from the control section 200, are input to the first highlight determination area extraction section 901. The image that has not been subjected to the isolated point noise correction process is stored in a line memory (not illustrated in the drawings).

Figure 12:
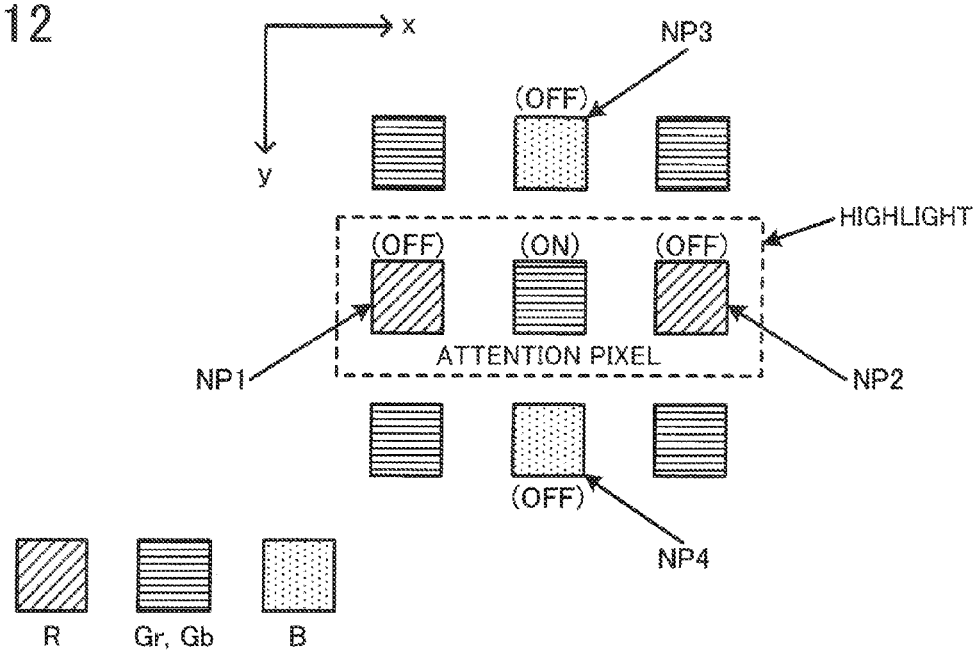
FIG. 12 is a view illustrating a process performed by a first highlight determination area extraction section and a process performed by an attention pixel highlight determination section.

As illustrated in FIG. 12, the first highlight determination area extraction section 901 extracts a given two-dimensional area (e.g., 3×3 pixel area) from the image stored in the line memory, the given two-dimensional area being formed around the position of the pixel for which the isolated point noise correction flag is set to "ON". The area extracted by the first highlight determination area extraction section 901 is referred to as "first highlight determination area", and the center pixel thereof is referred to as "first highlight determination attention pixel".

The first highlight determination area extraction section 901 (white balance correction processing section) performs a white balance correction process that multiplies the R signal and the B signal within the first highlight determination area by the white balance coefficient, and outputs the pixel values obtained by the white balance correction process to the attention pixel highlight determination section 903. The white balance correction process is performed since the highlight is originally white, and the RGB pixel values are equal. The determination process described later determines whether or not the pixel is a highlight taking account of the correlation between the pixel values that differ in color. The determination process is affected when the white balance is not adjusted (i.e., the pixel values that differ in color may not be equal). Therefore, the RGB gain is adjusted by performing the white balance correction process.

The pixel values within the first highlight determination area (that have been subjected to the white balance correction process) output from the first highlight determination area extraction section 901, a first coefficient (that differs from the first coefficient Co1 described above in connection with the first embodiment) output from the control section 200, and the isolated point noise correction flag (corresponding to each pixel within the first highlight determination area) output from the isolated point noise correction flag storage section 907, are input to the attention pixel highlight determination section 903.

As illustrated in FIG. 12, the attention pixel highlight determination section 903 extracts the pixel value of a pixel for which the isolated point noise correction flag is set to "OFF" from pixels NP1 to NP4 (i.e., adjacent pixels that differ in color) that are adjacent to the first highlight determination attention pixel in the upward/downward direction and the rightward/leftward direction (vertical scan direction y and horizontal scan direction x). In FIG. 12, the isolated point noise correction flag is represented by "(ON)" or "(OFF)". The attention pixel highlight determination section 903 calculates the absolute difference value between the extracted pixel value and the pixel value of the first highlight determination attention pixel. When a plurality of absolute difference values have been calculated, the attention pixel highlight determination section 903 selects the smallest value from the plurality of absolute difference values. When the isolated point noise correction flag is set to "ON" for all of the adjacent pixels NP1 to NP4, the attention pixel highlight determination section 903 sets the absolute difference value to the largest value so that the pixels NP1 to NP4 are not determined to be a highlight.

The attention pixel highlight determination section 903 divides the pixel value of the first highlight determination attention pixel by the first coefficient to calculate a threshold value (attention pixel highlight determination threshold value), and compares the selected absolute difference value with the threshold value. The attention pixel highlight determination section 903 determines that the first highlight determination attention pixel is a highlight candidate when the selected absolute difference value is smaller than the threshold value, and determines that the first highlight determination attention pixel is not a highlight candidate when the selected absolute difference value is equal to or larger than the threshold value. The attention pixel highlight determination section 903 outputs the determination result to the attention pixel highlight decision section 905 as an attention pixel highlight determination flag. The attention pixel highlight determination flag is set to "ON" (e.g., logic level "1") when it has been determined that the first highlight determination attention pixel is a highlight candidate, and is set to "OFF" (e.g., logic level "0") when it has been determined that the first highlight determination attention pixel is not a highlight candidate. The attention pixel highlight determination section 903 outputs information about the direction of the adjacent pixel corresponding to the selected absolute difference value with respect to the first highlight determination attention pixel to the adjacent pixel highlight determination section 904 as information about the correlation direction. The correlation direction is the upward direction (−y-direction in FIG. 13), the downward direction (+y-direction in FIG. 13), the leftward direction (−x-direction in FIG. 13), or the rightward direction (+x-direction in FIG. 13). For example, when the adjacent pixel NP1 in FIG. 12 corresponds to the selected absolute difference value, the correlation direction is the leftward direction (−x-direction). Note that the correlation direction is hereinafter appropriately referred to as "highlight correlation direction".

The image (that has been subjected to the isolated point noise correction process) output from the isolated point noise correction process part 125, and the isolated point noise correction flag output from the isolated point noise correction flag storage section 907, are input to the second highlight determination area extraction section 902. The image that has been subjected to the isolated point noise correction process is stored in a line memory (not illustrated in the drawings).

Figure 13:
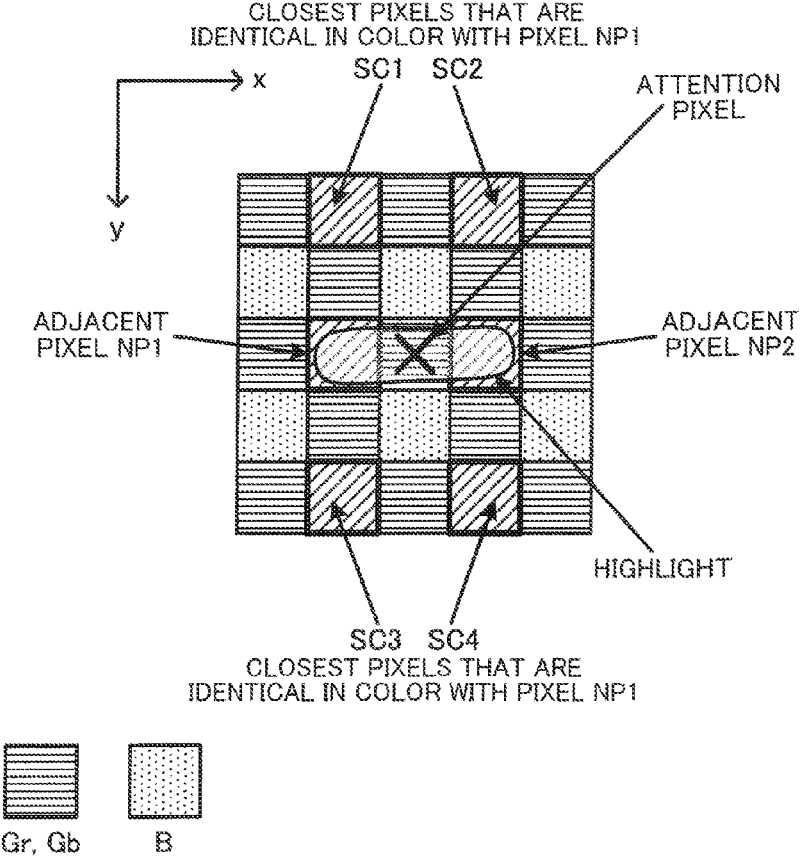
FIG. 13 is a view illustrating a process performed by a second highlight determination area extraction section and a process performed by an adjacent pixel highlight determination section.

As illustrated in FIG. 13, the second highlight determination area extraction section 902 extracts a given two-dimensional area (e.g., 5×5 pixel area) from the image stored in the line memory, the given two-dimensional area being formed around the position of the pixel for which the isolated point noise correction flag is set to "ON". The area extracted by the second highlight determination area extraction section 902 is referred to as "second highlight determination area", and the center pixel thereof is referred to as "second highlight determination attention pixel". The second highlight determination area extraction section 902 outputs the pixel values within the extracted second highlight determination area to the adjacent pixel highlight determination section 904.

The pixel values within the second highlight determination area output from the second highlight determination area extraction section 902, a second coefficient (that differs from the second coefficient Co2 described above in connection with the first embodiment) output from the control section 200, and information about the highlight correlation direction output from the attention pixel highlight determination section 903, are input to the adjacent pixel highlight determination section 904. Note that an example in which the highlight correlation direction is the leftward direction (−x-direction in FIG. 13) is described below.

As illustrated in FIG. 13, the adjacent pixel highlight determination section 904 extracts the pixel value of the pixel NP1 that is adjacent to the second highlight determination attention pixel in the highlight correlation direction (−x-direction) from the second highlight determination area. The adjacent pixel highlight determination section 904 also extracts the pixel values of pixels SC1 to SC4 that are identical in color with the pixel NP1 and situated closest to the pixel NP1 in the direction y that is orthogonal to the highlight correlation direction from the second highlight determination area. The adjacent pixel highlight determination section 904 determines whether or not the pixel values of the adjacent pixels NP1 and NP2 have a correlation with the pixel values of the closest pixels SC1 to SC4, and determines that the adjacent pixel is a highlight when the pixel values of the adjacent pixels NP1 and NP2 do have a correlation with the pixel values of the closest pixels SC1 to SC4.

Specifically, the adjacent pixel highlight determination section 904 averages the pixel values of two pixels among the closest pixels that are situated at a short distance to calculate two average pixel values. Specifically, the adjacent pixel highlight determination section 904 calculates the average value (first average value) of the pixel values of the closest pixels SC1 and SC2, and the average value (second average value) of the pixel values of the closest pixels SC3 and SC4. The adjacent pixel highlight determination section 904 multiplies each of the first average pixel value and the second average pixel value by the second coefficient output from the control section 200 to calculate a first threshold value and a second threshold value (adjacent pixel highlight determination first threshold value and adjacent pixel highlight determination second threshold value) that respectively correspond to the first average pixel value and the second average pixel value. The adjacent pixel highlight determination section 904 calculates the absolute difference value between the pixel value of the adjacent pixel NP1 and the first average value, and compares the absolute difference value with the first threshold value. The adjacent pixel highlight determination section 904 calculates the absolute difference value between the pixel value of the adjacent pixel NP1 and the second average value, and compares the absolute difference value with the second threshold value.

The adjacent pixel highlight determination section 904 determines that at least one (i.e., the pixel NP1) of the pixels NP1 to NP4 adjacent to the second highlight determination attention pixel is a highlight when at least one absolute difference value is larger than the corresponding threshold value. Specifically, the adjacent pixel highlight determination section 904 determines that the pixel NP1 is a highlight at least when the absolute difference value between the pixel value of the pixel NP1 and the first average value is larger than the first threshold value, or when the absolute difference value between the pixel value of the pixel NP1 and the second average value is larger than the second threshold value. The adjacent pixel highlight determination section 904 outputs the determination result to the attention pixel highlight decision section 905 as an adjacent pixel highlight determination flag. The adjacent pixel highlight determination flag is set to "ON" (e.g., logic level "1") when it has been determined that the pixel NP1 is a highlight, and is set to "OFF" (e.g., logic level "0") when it has been determined that the pixel NP 1 is not a highlight.

The attention pixel highlight decision section 905 determines that the attention pixel is a highlight when both the attention pixel highlight determination flag and the adjacent pixel highlight determination flag are set to "ON", and determines that the attention pixel is not a highlight when at least one of the attention pixel highlight determination flag and the adjacent pixel highlight determination flag is set to "OFF". Specifically, the attention pixel highlight determination section 903 calculates a logical AND of the attention pixel highlight determination flag and the adjacent pixel highlight determination flag, and outputs the calculation result to the attention pixel correction processing section 906 as a highlight determination flag. The highlight determination flag is set to "ON" when both the attention pixel highlight determination flag and the adjacent pixel highlight determination flag are set to "ON", and is set to "OFF" when at least one of the attention pixel highlight determination flag and the adjacent pixel highlight determination flag is set to "OFF".

The attention pixel highlight decision section 905 calculates a NAND of the attention pixel highlight determination flag and the adjacent pixel highlight determination flag, and outputs the calculation result to the isolated point noise correction flag storage section 907 as a revised isolated point noise correction flag. The revised isolated point noise correction flag is set to "OFF" when the highlight determination flag is set to "ON", and is set to "ON" when the highlight determination flag is set to "OFF". The isolated point noise correction flag storage section 907 updates the isolated point noise correction flag recorded corresponding to the pixel position with the revised isolated point noise correction flag corresponding to the pixel position. Specifically, when a pixel that has been detected as isolated point noise has been determined to be a highlight, the isolated point noise correction flag corresponding to this pixel is set to "OFF" from "ON".

The attention pixel correction processing section 906 outputs the pixel value of the first highlight determination attention pixel before the isolated point noise correction process (i.e., the pixel value before the white balance correction process is performed by the first highlight determination area extraction section 901) instead of the pixel value of the second highlight determination attention pixel. The attention pixel correction processing section 906 outputs the pixel value of the second highlight determination attention pixel when the input highlight determination flag is set to "OFF" (i.e., when it has been determined that at least one of the attention pixel and the adjacent pixel is not a highlight).

In the example illustrated in FIG. 13, the Gr signal corresponding to the attention pixel is determined to be isolated point noise, and the R signals corresponding to the adjacent pixels NP1 and NP2 are not determined to be isolated point noise for the reason described above with reference to FIG. 9. Therefore, a red false color occurs in the highlight area when the isolated point noise correction process is performed.

According to the second embodiment, the pixel value of the attention pixel that has been overcorrected as isolated point noise can be returned to the original pixel value (i.e., the pixel value before correction). Specifically, since the attention pixel and the adjacent pixels NP1 and NP2 are included within the highlight area, and have a similar pixel value, the attention pixel highlight determination section 903 determines that the attention pixel is a highlight candidate. Since the adjacent pixels NP1 and NP2 included within the highlight area have a large pixel value, the difference from the pixel values of the closest pixels SC1 to SC4 is large, and the adjacent pixel highlight determination section 904 determines that the adjacent pixels NP1 and NP2 are a highlight. When it has been determined that the attention pixel is a highlight candidate, and the adjacent pixels NP1 and NP2 are a highlight, the attention pixel highlight decision section 905 determines that the attention pixel is a highlight, and the attention pixel correction processing section 906 returns the pixel value of the attention pixel to the original pixel value (i.e., the pixel value before correction). This makes it possible to correct overcorrection due to a highlight.

3.3. Highlight Correction Process

Figure 14:
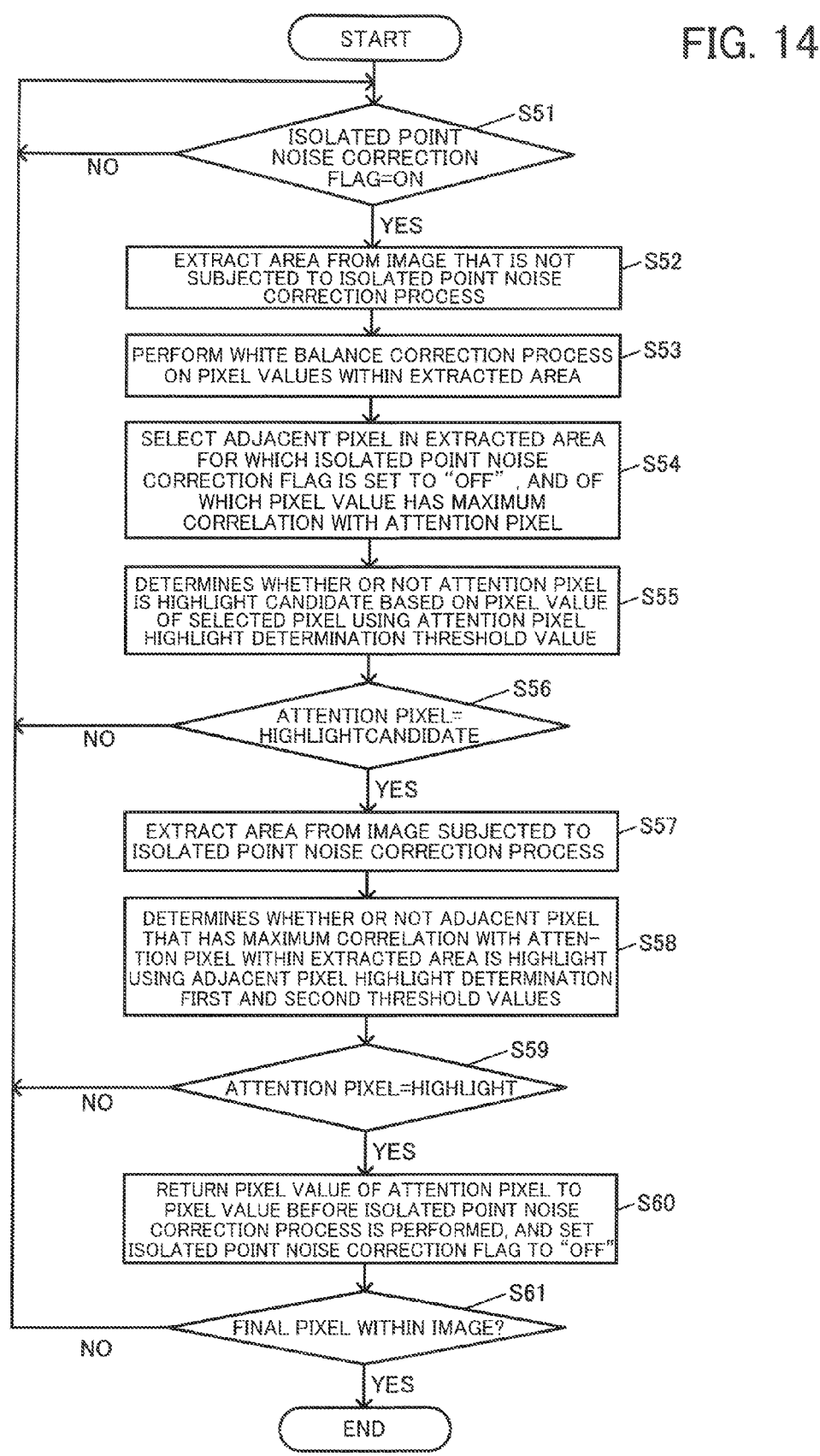
FIG. 14 is a flowchart illustrating a highlight correction process.

FIG. 14 is a flowchart illustrating the process performed by the highlight correction processing section 801. The first highlight determination area extraction section 901 determines whether or not the isolated point noise correction flag recorded in the isolated point noise correction flag storage section 907 is set to "ON" (i.e., whether or not the attention pixel has been subjected to the isolated point noise correction process) (step S51). When the isolated point noise correction flag corresponding to the attention pixel is set to "OFF", the next pixel is set to be the attention pixel, and the step S51 is performed. When the isolated point noise correction flag corresponding to the attention pixel is set to "ON", an area that has a given size (e.g., 3×3 pixels) and is formed around the position of the attention pixel is extracted from the image that is not subjected to the isolated point noise correction process (see FIG. 12) (step S52).

The first highlight determination area extraction section 901 performs the white balance correction process on the pixel values within the extracted area (step S53). The attention pixel highlight determination section 903 selects a pixel (e.g., the pixel NP1) among the pixels NP1 to NP4 that are situated adjacent to the first highlight detection attention pixel in the extracted area for which the isolated point noise correction flag is set to "OFF", and of which the pixel value after the white balance correction process has the maximum correlation with the first highlight detection attention pixel (step S54). The attention pixel highlight determination section 903 determines whether or not the first highlight detection attention pixel is a highlight candidate based on the pixel value of the selected pixel and the pixel value of the first highlight detection attention pixel (steps S55 and S56). When it has been determined that the first highlight detection attention pixel is not a highlight candidate, the next pixel is set to be the attention pixel, and the step S51 is performed.

When it has been determined that the first highlight detection attention pixel is a highlight candidate, the second highlight determination area extraction section 902 extracts a given area (e.g., 5×5 pixel area) from the image subjected to the isolated point noise correction process (see FIG. 13) (step S57). The adjacent pixel highlight determination section 904 determines whether or not the adjacent pixel (NP1) that has the maximum correlation with the second highlight detection attention pixel is a highlight based on the pixel values of the pixels SC1 to SC4 that are identical in color with the second highlight detection attention pixel, and are situated closest to the second highlight detection attention pixel within the extracted area, and the pixel value of the adjacent pixel (NP1) selected by the attention pixel highlight determination section 903 (step S58).

The attention pixel highlight decision section 905 determines whether or not the first highlight detection attention pixel has been determined to be a highlight candidate, and the adjacent pixel (NP1) that has the maximum correlation with the second highlight detection attention pixel has been determined to be a highlight, and determines whether or not the second highlight detection attention pixel is a highlight (step S59). When it has been determined that the second highlight detection attention pixel is not a highlight candidate, the next pixel is set to be the attention pixel, and the step S51 is performed. When it has been determined that the second highlight detection attention pixel is a highlight, the attention pixel correction processing section 906 returns the pixel value of the second highlight detection attention pixel to the pixel value before the isolated point noise correction process is performed, and the isolated point noise correction flag storage section 907 sets (returns) the isolated point noise correction flag corresponding to the second highlight detection attention pixel to "OFF" (step S60).

Whether or not all of the pixels within the image have been processed is then determined (step S61). When all of the pixels within the image have not been processed, the step S51 is performed. When all of the pixels within the image have been processed, the process is terminated.

According to the second embodiment, the image processing device includes the highlight correction processing section 801 (see FIG. 10). The highlight correction processing section 801 determines whether or not the attention pixel that has been corrected by the isolated point noise correction section 125 is a pixel within the highlight area, and returns the pixel value of the attention pixel to the pixel value before being corrected by the isolated point noise correction section 125 when it has been determined the attention pixel is a pixel within the highlight area.

According to this configuration, even when a pixel within the highlight area has been overcorrected as isolated point noise, the overcorrected pixel value can be returned to the pixel value before the isolated point noise correction process is performed. This makes it possible to improve the isolated point noise correction accuracy, and suppress occurrence of an artifact in the highlight area.

The image for which isolated point noise is corrected may be an image in which pixels that differ in color (e.g., RGB pixels) are disposed (e.g., disposed in a Bayer array). The highlight correction processing section 801 may include the attention pixel highlight determination section 903 (see FIG. 11). The attention pixel highlight determination section 903 may compare the pixel value of the attention pixel that has not been corrected by the isolated point noise correction section 125 with the pixel values of different-color adjacent pixels NP1 to NP4 that differ in color from the attention pixel and are situated adjacent to the attention pixel to determine whether or not the attention pixel is a candidate for a pixel within the highlight area.

According to this configuration, since the attention pixel and the different-color adjacent pixels NP1 to NP4 have a small difference in pixel value when the attention pixel and the different-color adjacent pixels NP 1 to NP4 are included within an identical highlight area, it is possible to detect that it is likely that the attention pixel is included within the highlight area.

The attention pixel highlight determination section 903 may select a pixel (e.g., pixel NP1) among the different-color adjacent pixels NP1 to NP4 that has a pixel value closest to the pixel value of the attention pixel as a selected pixel (see FIG. 12). The highlight correction processing section 801 may include the adjacent pixel highlight determination section 904 (see FIG. 11). When the attention pixel highlight determination section 903 has determined that the attention pixel is a candidate for a pixel within the highlight area, the adjacent pixel highlight determination section 904 may compare the pixel value of the selected pixel NP1 with the pixel values of the pixels SC1 to SC4 that are identical in color with the selected pixel NP1 and are situated at a given position with respect to the selected pixel NP1 to determine whether or not the selected pixel NP1 is a pixel within the highlight area.

For example, the given position with respect to the selected pixel refers to the positions of four pixels (i.e., the pixels SC1 to SC4) among the pixels that are identical in color with the selected pixel that are situated closest to the attention pixel in the direction (y-direction) that is orthogonal to the direction of the selected pixel with respect to the attention pixel (i.e., the −x-direction in FIG. 13 when the selected pixel is the pixel NP1).

Even when the attention pixel highlight determination section 903 has determined that the attention pixel is a highlight candidate, the attention pixel may not be a highlight when the adjacent pixel is not included within the highlight area. According to the second embodiment, since it is possible to determine whether or not the adjacent pixel is included within the highlight area, it is possible to determine whether or not the attention pixel is included within the highlight area.

4. Imaging Device

Figure 15:
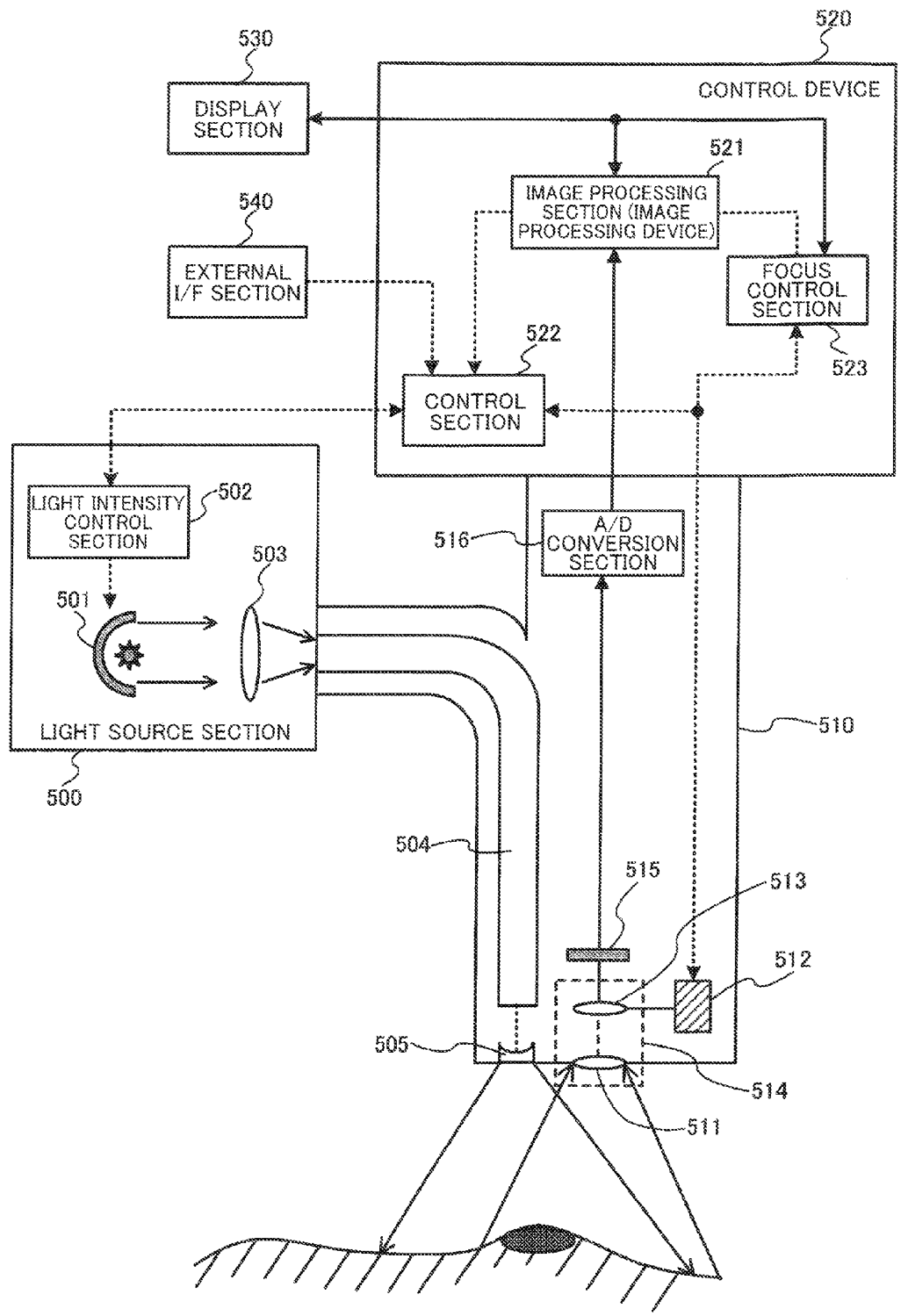
FIG. 15 illustrates a configuration example of an endoscope apparatus.

FIG. 15 illustrates a configuration example of an endoscope apparatus as a configuration example of an imaging device to which the above image processing device is applied. The endoscope apparatus includes a light source section 500, an imaging section 510 (insertion section), a control device 520 (processing section), a display section 530, and an external OF section 540.

The light source section 500 includes a light source 501 that emits illumination light, a light intensity control section 502 that controls the intensity of the illumination light, and a condenser lens 503 that focuses the illumination light emitted from the light source 501. The imaging section 510 is formed to be elongated and flexible so that the imaging section 510 can be inserted into the observation target.

The imaging section 510 includes a light guide fiber 504 that guides the illumination light focused by the condenser lens 503, and an illumination lens 505 that diffuses the illumination light guided by the light guide fiber 504 to illuminate the object. The imaging section 510 also includes an objective lens 511 and a focus lens 513 that form an object image, a focus lens driver section 512 that drives the focus lens 513, an image sensor 515 that captures the object image, and an A/D conversion section 516 that converts an analog signal from the image sensor 515 into a digital signal.

The control device 520 includes an image processing section 521 (image processing device) that performs image processing on the image input from the A/D conversion section 516, a control section 522 that controls each section of the endoscope apparatus, and a focus control section 523 that performs a focus adjustment process by controlling the focus lens driver section 512. The image processing section 521 performs the isolated point noise correction process, the highlight correction process, and the like (see above).

Although an example in which the imaging device is an endoscope apparatus has been described above, the embodiments of the invention are not limited thereto. The embodiments of the invention may be applied to various imaging devices. For example, the imaging device may be a digital camera that captures a still image, a video camera that captures a movie, a capsule endoscope, or the like. For example, a capsule endoscope is configured so that the capsule situated inside the body of the subject and the receiver situated outside the body of the subject communicate via wireless communication, and random isolated point noise may occur due to a transmission error during wireless communication. According to the embodiments of the invention, it is possible to appropriately correct isolated point noise even when random isolated point noise has occurred in the vicinity of an edge area.

Although the embodiments of the invention have been described above taking an example in which each section of the image processing device is implemented by hardware, the embodiments of the invention are not limited thereto. For example, the embodiments of the invention may also be applied to the case where a known computer system (e.g., work station or personal computer) is used as the image processing device. In this case, each section of the image processing device may be implemented by providing a program (image processing program) that implements the process performed by each section of the image processing section in advance, and causing the CPU of the computer system to execute the image processing program.

More specifically, a program stored in an information storage device is read, and executed by a processor (e.g., CPU). The information storage device (computer-readable device) stores a program, data, and the like. The information storage device may be an arbitrary recording device that records a program that can be read by a computer system, such as a portable physical device (e.g., CD-ROM, USB memory, MO disk, DVD disk, flexible disk (FD), magnetooptical disk, or IC card), a stationary physical device (e.g., HDD, RAM, or ROM) that is provided inside or outside a computer system, or a communication device that temporarily stores a program during transmission (e.g., public line connected through a modem, or a local area network or a wide area network to which another computer system or a server is connected).

Specifically, a program is recorded in the recording device so that the program can be read by a computer. A computer system (i.e., a device that includes an operation section, a processing section, a storage section, and an output section) implements the image processing device by reading the program from the recording device, and executing the program. Note that the program need not necessarily be executed by a computer system. The embodiments of the invention may similarly be applied to the case where another computer system or a server executes the program, or another computer system and a server execute the program in cooperation.

The image processing device and the like according to the embodiments of the invention may include a processor and a memory. The processor may be a central processing unit (CPU), for example. Note that the processor is not limited to a CPU. Various other processors such as a graphics processing unit (GPU) or a digital signal processor (DSP) may also be used. The processor may be a hardware circuit that includes an ASIC. The memory stores a computer-readable instruction. Each section of the image processing device and the like according to the embodiments of the invention is implemented by causing the processor to execute the instruction. The memory may be a semiconductor memory (e.g., SRAM or DRAM), a register, a hard disk, or the like. The instruction may be an instruction included in an instruction set of a program, or may be an instruction that causes a hardware circuit of the processor to operate.

Although only some embodiments of the invention and the modifications thereof have been described in detail above, those skilled in the art will readily appreciate that many modifications are possible in the embodiments and the modifications thereof without materially departing from the novel teachings and advantages of the invention. A plurality of elements described in connection with the above embodiments and the modifications thereof may be appropriately combined to implement various configurations. For example, some of the elements described in connection with the above embodiments and the modifications thereof may be omitted. Arbitrary elements among the elements described in connection with different embodiments and the modifications thereof may be appropriately combined. Specifically, various modifications and applications are possible without materially departing from the novel teachings and advantages of the invention. Any term cited with a different term having a broader meaning or the same meaning at least once in the specification and the drawings can be replaced by the different term in any place in the specification and the drawings.

What is claimed is:
1. An image processing device comprising:
a hardware processor which is configured to perform:
an isolated point noise detection process that detects an isolated point noise that is included in an image; and
an isolated point noise correction process that corrects the isolated point noise detected by the isolated point noise detection process,
wherein the isolated point noise detection process includes an isolated point noise presence/absence determination process and an attention pixel isolated point noise determination process,
wherein the isolated point noise presence/absence determination process determines whether or not the isolated point noise is included within a given area based on a first index value that represents a range of first to nth pixel values, and a second index value that represents a range of a pixel value group, the given area including an attention pixel that is an isolated point noise detection target, the first to nth pixel values being obtained by arranging pixel values of pixels within the given area in ascending or descending order, and the pixel value group being obtained by excluding at least one of the first pixel value and the nth pixel value from the first to nth pixel values, and
wherein the attention pixel isolated point noise determination process determines whether or not the attention pixel is a pixel that corresponds to the isolated point noise when it has been determined that the isolated point noise is included within the given area.

2. The image processing device as defined in claim 1, wherein the isolated point noise presence/absence determination process calculates a difference between the first pixel value and the nth pixel value as the first index value, and calculates a difference between a largest value and a smallest value among pixel values included in the pixel value group as the second index value.

3. The image processing device as defined in claim 2, wherein the pixel value group includes second to (n−1)th pixel values among the first to nth pixel values, and
wherein the isolated point noise presence/absence determination process calculates a difference between the second pixel value and the (n−1)th pixel value included in the pixel value group as the second index value.

4. The image processing device as defined in claim 1, wherein the isolated point noise presence/absence determination process determines that the isolated point noise is included within the given area when the first index value is larger than a value obtained by multiplying the second index value by a first coefficient.

5. The image processing device as defined in claim 1, wherein the attention pixel isolated point noise determination process determines that the attention pixel is the pixel that corresponds to the isolated point noise when an absolute difference value between a given value within the range of the pixel value group and a pixel value of the attention pixel is larger than a value obtained by multiplying the second index value by a second coefficient.

6. The image processing device as defined in claim 5, wherein the given value is a median value among pixel values included in the pixel value group.

7. The image processing device as defined in claim 1, wherein the isolated point noise correction process corrects the attention pixel using a value obtained from the first to nth pixel values when it has been determined that the attention pixel is a pixel that corresponds to the isolated point noise.

8. The image processing device as defined in claim 7, wherein the isolated point noise correction process corrects the attention pixel by replacing a pixel value of the attention pixel with a median value among the first to nth pixel values.

9. The image processing device as defined in claim 1, wherein the image for which the isolated point noise is corrected is an image in which pixels that differ in color are disposed, and wherein the first to nth pixel values are pixel values of pixels among pixels included in the given area that are identical in color with the attention pixel.

10. The image processing device as defined in claim 1, wherein the hardware processor is further configured to perform a highlight correction processing process that determines whether or not the attention pixel that has been corrected by the isolated point noise correction process is a pixel within a highlight area, and that returns a pixel value of the attention pixel to a pixel value before the attention pixel is corrected by the isolated point noise correction process when it has been determined that the attention pixel is a pixel within the highlight area.

11. The image processing device as defined in claim 10, wherein the image for which the isolated point noise is corrected is an image in which pixels that differ in color are disposed, and wherein the highlight correction processing process includes an attention pixel highlight determination process that compares the pixel value of the attention pixel that has not been corrected by the isolated point noise correction process with pixel values of different-color adjacent pixels that differ in color from the attention pixel and are situated adjacent to the attention pixel to determine whether or not the attention pixel is a candidate for a pixel within the highlight area.

12. The image processing device as defined in claim 11, wherein the attention pixel highlight determination process compares a pixel value of a pixel among the different-color adjacent pixels that has not been corrected by the isolated point noise correction process with the pixel value of the attention pixel that has not been corrected by the isolated point noise correction process.

13. The image processing device as defined in claim 11, wherein the hardware processor is further configured to perform a white balance correction process on the different-color adjacent pixels, and wherein the attention pixel highlight determination process determines whether or not the attention pixel is a candidate for a pixel within the highlight area based on the different-color adjacent pixels that have been subjected to the white balance correction process.

14. The image processing device as defined in claim 11, wherein the attention pixel highlight determination process selects a pixel among the different-color adjacent pixels that has a pixel value closest to the pixel value of the attention pixel as a selected pixel, and wherein the highlight correction processing process includes an adjacent pixel highlight determination process that compares the pixel value of the selected pixel with pixel values of pixels that are identical in color with the selected pixel and are situated at a given position with respect to the selected pixel to determine whether or not the selected pixel is a pixel within the highlight area, when the attention pixel highlight determination process has determined that the attention pixel is a candidate for a pixel within the highlight area.

15. The image processing device as defined in claim 14, wherein the highlight correction processing process includes an attention pixel highlight decision process that determines that the attention pixel is a pixel within the highlight area when the attention pixel highlight determination process has determined that the attention pixel is the candidate for the pixel within the highlight area, and the adjacent pixel highlight determination process has determined that the different-color adjacent pixels are pixels within the highlight area.

16. An endoscope apparatus comprising the image processing device as defined in claim 1.

17. An isolated point noise correction method comprising:
calculating a first index value that represents a range of first to nth pixel values, and a second index value that represents a range of a pixel value group, the first to nth pixel values being obtained by arranging pixel values of pixels within a given area in ascending or descending order, the pixel value group being obtained by excluding at least one of the first pixel value and the nth pixel value from the first to nth pixel values, and the given area including an attention pixel that is an isolated point noise detection target;
determining whether or not an isolated point noise is included within the given area based on the first index value and the second index value;
determining whether or not the attention pixel is a pixel that corresponds to the isolated point noise when it has been determined that the isolated point noise is included within the given area; and
correcting a pixel value of the attention pixel when it has been determined that the attention pixel is the pixel that corresponds to the isolated point noise.

18. A non-transitory computer-readable storage device with an executable image processing program stored thereon, wherein the image processing program instructs a computer to perform functions comprising:
calculating a first index value that represents a range of first to nth pixel values, and a second index value that represents a range of a pixel value group, the first to nth pixel values being obtained by arranging pixel values of pixels within a given area in ascending or descending order, the pixel value group being obtained by excluding at least one of the first pixel value and the nth pixel value from the first to nth pixel values, and the given area including an attention pixel that is an isolated point noise detection target;
determining whether or not an isolated point noise is included within the given area based on the first index value and the second index value;
determining whether or not the attention pixel is a pixel that corresponds to the isolated point noise when it has been determined that the isolated point noise is included within the given area; and
correcting a pixel value of the attention pixel when it has been determined that the attention pixel is the pixel that corresponds to the isolated point noise.

* * * * *